US010646961B2

(12) United States Patent
Bader et al.

(10) Patent No.: US 10,646,961 B2
(45) Date of Patent: May 12, 2020

(54) LASER-MACHINING DEVICE

(71) Applicant: Bystronic Laser AG, Niederönz (CH)

(72) Inventors: Roland Bader, Rütschelen (CH); Andreas Lüdi, Burgdorf (CH)

(73) Assignee: BYSTRONIC LASER AG (CH)

( * ) Notice: Subject to any disclaimer, the term of this patent is extended or adjusted under 35 U.S.C. 154(b) by 246 days.

(21) Appl. No.: 15/573,711

(22) PCT Filed: May 13, 2016

(86) PCT No.: PCT/IB2016/052778
§ 371 (c)(1),
(2) Date: Nov. 13, 2017

(87) PCT Pub. No.: WO2016/181359
PCT Pub. Date: Nov. 17, 2016

(65) Prior Publication Data
US 2018/0147671 A1 May 31, 2018

(30) Foreign Application Priority Data
May 13, 2015 (EP) .................................... 15167695

(51) Int. Cl.
 *B23K 26/352* (2014.01)
 *B23K 26/14* (2014.01)
 (Continued)

(52) U.S. Cl.
 CPC .......... *B23K 26/352* (2015.10); *B23K 26/032* (2013.01); *B23K 26/064* (2015.10);
 (Continued)

(58) Field of Classification Search
 CPC .. B23K 26/352; B23K 26/1476; B23K 26/38; B23K 26/032; B23K 26/0648;
 (Continued)

(56) References Cited

U.S. PATENT DOCUMENTS 5,938,953 A 8/1999 Jurca
10,427,242 B2 * 10/2019 Regaard ............... B23K 26/032
(Continued)

FOREIGN PATENT DOCUMENTS

DE 102012102785 2/2013
EP 2 687 317 * 1/2014 ............. B23K 26/04

*Primary Examiner* — David J Walczak
(74) *Attorney, Agent, or Firm* — Workman Nyedegger

(57) ABSTRACT

A laser-machining device includes an arrangement for producing and guiding a working laser beam. The arrangement includes a nozzle having an opening for emission of the working laser beam to a machining zone. An optical axis is defined in the arrangement and at least one element focuses the working laser beam near the opening of the nozzle. The machining process is monitored via at least one group of detector arrangements for a radiation characteristic of the machining process and an associated evaluating unit. The detector arrangements of each group are arranged in a ring shape about the optical axis. The observation direction of the detector arrangements extends, at least in a sub-region, between the focusing element closest to the machining zone and the machining zone, at a polar angle, in relation to the optical axis of the working laser beam.

27 Claims, 15 Drawing Sheets

Figure 1:
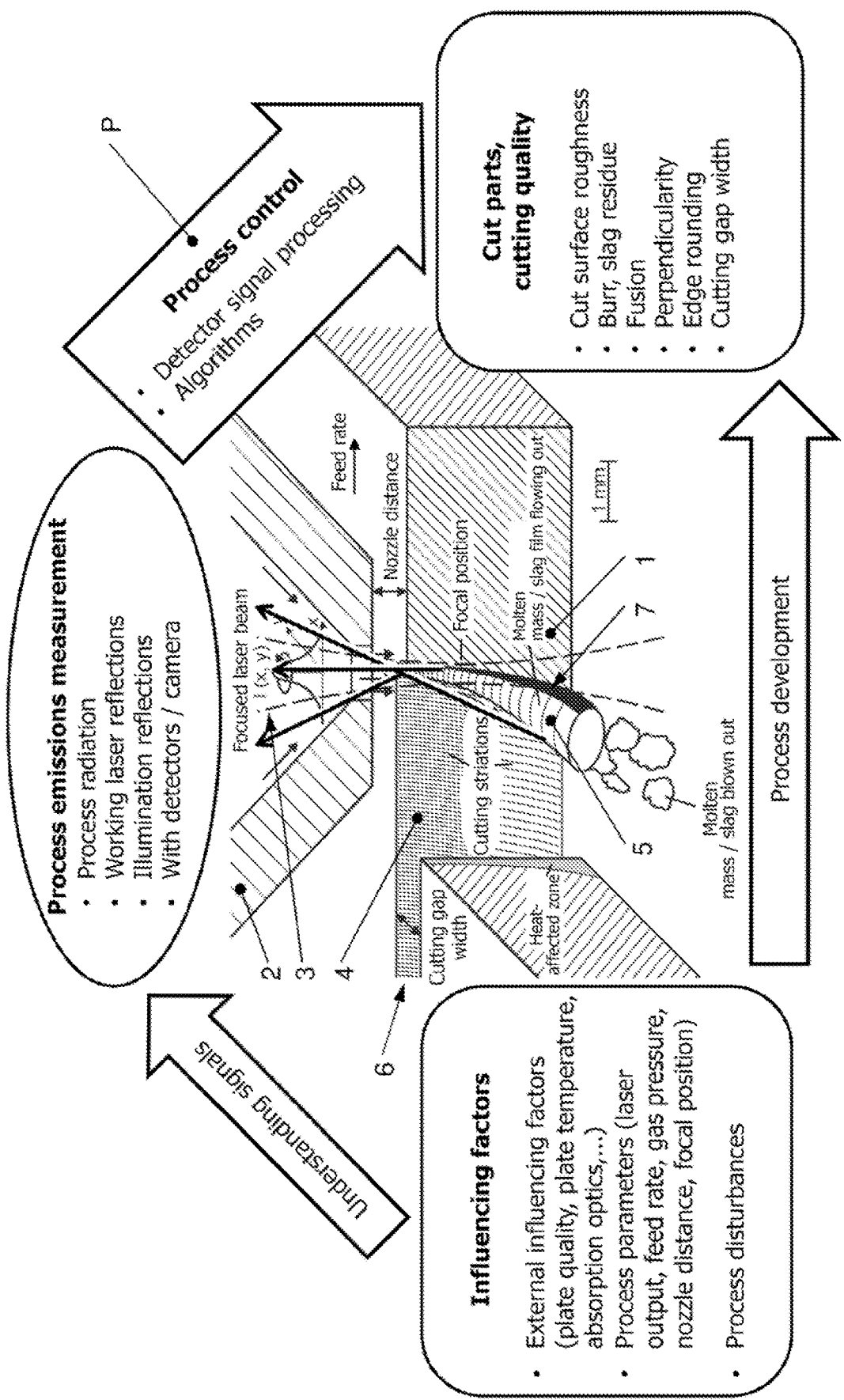

(51) Int. Cl.
*B23K 26/38* (2014.01)
*B23K 26/03* (2006.01)
*B23K 26/06* (2014.01)
*B23K 26/064* (2014.01)

(52) U.S. Cl.
CPC ...... *B23K 26/0648* (2013.01); *B23K 26/1476* (2013.01); *B23K 26/38* (2013.01)

(58) Field of Classification Search
CPC .............. B23K 26/064; B23K 26/0626; B23K 31/125; B23K 26/02
See application file for complete search history.

(56) References Cited

U.S. PATENT DOCUMENTS

| | | | |
|---|---|---|---|
| 2008/0000888 A1 | 1/2008 | Schulz et al. | |
| 2011/0108533 A1* | 5/2011 | Boettcher | B23K 26/043 219/121.72 |
| 2013/0319980 A1* | 12/2013 | Hesse | B23K 26/032 219/121.62 |

* cited by examiner $$\beta = \sin^{-1}\left[\frac{s}{r}\left(\frac{a}{d}+\frac{1}{2}\right)\right]$$

LASER-MACHINING DEVICE

The invention relates to a laser-machining device—in particular, a laser cutting device—according to the preamble of claim 1.

For machining workpieces by means of a laser beam, a device is equipped with an arrangement for producing and guiding a working laser beam. The laser beam is generally guided through an opening of a nozzle to an interaction zone or machining zone. The arrangement for guiding the working laser beam defines an optical axis and has at least one focusing element, e.g., a focusing or cutting lens, near the opening.

Such a laser-machining device is, for example, described in EP 2687317 A1, wherein an observation arrangement is also disclosed, which serves to center the nozzle with respect to the working laser beam in order to avoid the nozzle being touched by the working laser beam. An observation of the machining zone is, on the other hand, not provided, and the detector arrangement is also not designed for this purpose. For the best possible nozzle centering, the observation direction of the detector arrangement must be as coaxial as possible, wherein any deviations from coaxiality necessarily result from the high-power working laser beam being in the way of a purely coaxial observation, as can be seen in the purely schematic figures of EP 2687317 A1. Since this high-power working laser beam consists of long-wave CO2 radiation, any transmissive or partially transmitting optics in the coaxial direction not necessarily needed must be avoided, which is why the nozzle tip is observed non-coaxially according to the teaching of EP 2687317 A1, in order to avoid any interaction with the machining beam. Lastly, the detector arrangement must also be as distant from the nozzle tip as possible—ideally, behind the focusing lens—so that the polar angle is as small as possible for an optimal nozzle centering.

In order to be able to control such devices to achieve the best possible machining result or in order to at least be able to determine inadequate machining results, an arrangement for monitoring the machining process can, advantageously, be provided.

The radiation of the machining process is measured using detectors and sensors, or images of the interaction or machining zone are captured by means of a camera. In doing so, different parts of the ultraviolet or visible light spectrum, of the near or far infrared, are detected, depending upon the application. From the measured values, quality indicators are determined, which are mostly also used for controlling, in addition to mere monitoring.

In the literature, detectors are proposed which detect the radiation from the process zone coaxially or concentrically (and in parallel) to the machining laser beam, either by means of photo detectors (as described in De Keuster J., Duflou J. R.: "Monitoring of high-power CO2 laser cutting by means of an acoustic microphone and photodiodes," International Journal of Advanced Manufacturing Technology 35 (1-2), 115-126, 2007) or camera (as described in Sichani E. F., Duflou J. R.: "Monitoring and adaptive control of CO2 laser flame cutting," Physics Procedia 5, Lane 2010). In doing so, the process radiation is decoupled from the beam path of the working laser beam above the focusing optics, i.e., in the protected internal space of the machining head, by means of dichroic mirrors or deflection aperture mirrors or scraper mirrors. Due to the large distance of the focusing optics from the process zone and the cutting nozzle, its small opening virtually limits the field of vision to the nozzle diameter, and the angle spectrum of the detected radiation is smaller than 5° due to the aperture of the focusing optics.

In the case of flat-bed, laser cutting systems, it is known to monitor the process for plasma formation. By detecting bright plasma light instead of dark process light during normal machining, defective parts in laser fusion cutting (with the cutting gas nitrogen) can be prevented. To this end, a photo detector is mounted on or in the cutting head, and its signal is monitored for exceeding a previously determined threshold value. This approach can, however, not be used for detecting quality defects without plasma formation and, in particular, not in the case of cost-effective laser flame cutting, which works with oxygen as process gas. The laser flame cutting process is predominantly used in the machining of unalloyed steel plates and constitutes the largest portion of the production on laser cutting machines.

For laser flame cutting, only very few specialized devices and methods are known. De Keuster J., Duflou J. R.: "Monitoring of high-power CO2 laser cutting by means of an acoustic microphone and photodiodes," International Journal of Advanced Manufacturing Technology 35 (1-2), 115-126, 2007, describes an arrangement with three photodiodes distributed circumferentially behind the cutting lens in the cutting head, wherein, due to the small possible distance of the photodiodes to the optical axis and due to the placement above the cutting lens, a detection of the radiation is possible only in a small angle spectrum. The clear detection of quality defects is thus not possible.

Monitoring methods for laser flame cutting with a spatially resolved observation of the process zone by means of a coaxial camera are also known, wherein characteristics of the process are calculated for real-time controlling from the camera images of the interaction zone by means of digital image processing. A suitable camera system for this purpose is disclosed in EP 1 886 757 A1.

DE 10 2013 209 526 A1 furthermore discloses a method which can detect a process interruption during laser flame cutting. The camera images of the process zone are analyzed with respect to the occurrence of slag drops, which indicate process interruption. This worst of all quality defects during laser flame cutting can, however, also be detected by means of a traditional simple photodiode system and suitable signal processing algorithms. In addition, the much smaller quality defect of slag residue in the cutting gap already results in defective parts, which the disclosed method obviously cannot detect.

The following prior art discloses all devices and methods not specialized for laser flame cutting, which is why adequate monitoring is not possible with them. This fact is supported in that no commercial system is available today that can monitor the laser flame cutting process.

DE 10 2011 003 717 A1 discloses a method and a device that capture the interaction zone during laser cutting by means of a coaxial camera and detect various geometric features of the interaction zone and adjacent cutting gap edges by means of image processing. At least one cutting quality indicator is calculated therefrom.

WO 2012143899 discloses a method and a device that monitors and controls the laser machining process by means of a detector unit comprising photodiodes and various wavelength bandpass filters. The photodiode is located laterally, and the light from the process zone is guided from emitting materials located there to this lateral (and non-coaxial) detector by means of a non-coaxial mirror.

EP 2 357 057 A1 describes a method for monitoring and controlling a laser machining process, which method can determine the cutting quality by means of detected detector signals and statistical models. From the detector signals are calculated characteristics, which are standardized using the characteristics of a reference cut. By means of a plurality of statistical models, the association of the current machining result with a certain cutting quality and an associated corrective measure is determined in the form of a machining parameter change.

EP 1 275 465 B1 describes a system for automatically detecting poor cutting quality—in particular, burr—without having to store reference signals. The process radiation is decoupled from the working beam path using a semi-reflecting mirror and guided via an optical filter to a photodiode. The signal is digitally converted and filtered with a bandpass filter in the high-frequency range. Conclusions regarding slag residue or burr can directly be drawn therefrom.

U.S. Pat. No. 7,173,227 B2 discloses a detector which measures the emitted radiation from the machining process in order to thus be able to control the laser output and the machining feed rate. In an initialization phase prior to the delivery of the machine, a characteristic curve of the laser output versus the machining quality is recorded for each material. Prior to each machining process, and routinely during machining, the system is automatically adjusted using a calibration light source.

DE 10 2005 024 085 A1 discloses a laser machining head with a camera and a coaxial photo detector for monitoring or characterizing a laser machining process.

DE102010020183 A1 discloses a laser cutting head which is equipped with a camera for determining the cutting gap width. In doing so, the cutting gap can also be illuminated.

DE 102011 004 117 A1 discloses a method for checking laser-cut workpieces. After cutting a (small) inner contour or a hole, the cutting head is positioned in the center of said contour, and it is checked by another penetration as to whether or not the scrap part has fallen out. If no emissions occur during the penetration, the hole has fallen out. A similar method is disclosed by DE 10 2010 039 525 A1, according to which the check for the presence of the cut inner contour is verified using the distance sensor of the cutting nozzle. Both methods are used for the quality control of perforated plates, before the latter undergo additional stages of production.

In US 2004 0195215, the cutting depth in laser sublimation cutting of metals and composite materials is controlled using laser distance sensors. The method is preferably used for perforating airbag claddings.

WO 2010057662 A1 discloses a system that detects process emissions using at least two detectors. In doing so, acoustic sensors, photo detectors, and a camera can be used. From the original signals, characteristics are calculated using suitable methods of statistical dimension reduction. Production processes, such as laser welding, are supported and even controlled by means of expert knowledge.

WO 2012000650 A1 discloses a system that classifies the machining quality from camera images of the process zone using artificial intelligence methods, and controls the production process, such as the laser welding. In this way, the process safety and flexibility, as well as the ease of operation, are increased.

In contrast to the solutions with pure radiation detection explained above, WO 2015036140 A1 lastly discloses an image capturing device with a single camera, positioned for structural reasons far above the nozzle and the machining optics, for observing the machining zone in order to thus produce an image of the interaction region. The imaging optics arranged upstream of the camera decouple an eccentric radiation beam using, for example, an eccentric aperture, in order to look into the cutting gap in the direction opposite the machining direction (i.e., opposite the movement direction of the laser machining head, i.e., "trailing"). In doing so, a complex imaging optics that takes up much space is also required, in order to image one or more images non-coaxially onto the camera.

One of the disadvantages of such an arrangement is that the camera must be arranged behind the focusing lens for the working laser beam, which causes limitations regarding the maximum viewing angle and is thus not sufficient for monitoring, in particular, a flame cutting process. With the cutting optics of common laser machining heads, a viewing angle of at most 5° can be achieved. In contrast, viewing angles of up to 15° are discussed in WO 2012000650 A1, and approximately 10° are required for the flame cutting process. The consequence would be that the cutting or focusing lens would have to be enlarged by at least a factor of 2 compared to the known designs. Even though this is, in principle, possible, it results in a significant enlargement and considerable weight increase of the laser machining head, and therefore does not allow for building slender, lightweight laser machining heads that make possible highly dynamic laser cutting. This solution is thus, conceivably, unsuitable for practical industrial application.

Another possibility for increasing the observation angle with a camera arranged in the laser cutting head provides, according to WO 2012000650 A1, for looking next to the cutting lens through to the observation zone. However, this does not seem to be implementable, due to the required mounting, and is also not at all explained any further. A possibility not mentioned for allowing a large viewing angles consists in a camera, together with the upstream imaging optics with a semi-reflecting oblique mirror, being installed below the cutting or focusing lens. This cannot, however, be implemented in a manner suitable for industrial purposes, for reasons such as contamination, limited space available, etc.

Another disadvantage of the method disclosed in WO 2012000650 A1 consists in the camera images captured in a trailing observation containing only very few distinct image features. It is accordingly pointed out that the evaluation of the total image intensity already provides the essential information, in order to be able to draw conclusions regarding the angle of the cutting front.

Against this background, it is an aim of the present invention to provide a laser-machining device with an arrangement for monitoring, in particular, a laser flame cutting process, which device can reliably detect substantial quality defects, such as slag residue, in real-time during the machining process, and can prevent defective parts. Moreover, the device is to be adapted to the specific properties of laser flame cutting. Another aim of the present invention is to improve a laser-machining device—in particular, for carrying out laser flame cutting processes—such that as complete a detection as possible of radiation from the process zone can be ensured, in order to allow for an improved determination of quality features in various laser machining methods as early as during the cutting process.

The aim is achieved by the features of the independent claim. Advantageous developments are shown in the figures and in the dependent claims.

According to the invention, a laser-machining device as characterized above—in particular, for a laser cutting device—is equipped with at least one group of detector arrangements which are sensitive to a radiation characteristic of the machining process. These detector arrangements are associated with at least one evaluating unit, wherein the detector arrangements of each group are arranged in a ring shape about the optical axis. The observation direction of the detector arrangements—which term, "observation direction," denotes the central axis in the case of a, for example, cone-shaped, observation radiation beam—is oriented, at least in a sub-region between the focusing element closest to the machining zone and the machining zone, at a polar angle greater than 5° in relation to the optical axis of the working laser beam. This sub-region with an observation direction with a large polar angle is in this case preferably located in a sub-region at a greater distance from the focusing element—in particular, in a region between the machining zone and the lower edge region of the nozzle. A particularly preferred embodiment in this case provides for observation directions at a polar angle greater than or equal to 7°—in particular, at a polar angle of approximately 10° or more.

The arrangement according to the invention thus provides radiation detector arrangements for a radiation characteristic of the machining process, which radiation detector arrangements do not require any complicated, heavy, image-generating optics requiring much space or any aperture enlargement of the optics for the working laser beam in order to allow observation at larger polar angles, and therefore do not make the laser machining heads larger or heavier. The monitoring arrangement can therefore be accommodated in a commercially available laser cutting head without any difficulty. The optimal process monitoring can take place online by determining the total intensity of the radiation from the machining zone by means of radiation detectors with a very high temporal resolution, which could otherwise be achieved only with high-speed cameras.

The detector arrangements are preferably arranged along at least one circle coaxial and substantially orthogonal to the optical axis, in order to easily allow observation of the machining zone from any direction or make possible the consideration of any—even alternating—movement or feed directions, i.e., in particular, in order to look at any region of the machining zone at any time. Thus, observation of the entire cutting gap at any time is also ensured. The machining zone can thus, in particular, also be viewed at any time in a trailing manner, i.e., in the direction opposite the movement direction of the machining head. In doing so, certain deviations from the circular shape and/or from coaxiality of the detector arrangements can naturally also occur, if necessitated by the structural conditions of the respective laser machining head.

The laser-machining device according to the invention is preferably characterized in that at least one optical intermediate element for at least one detector arrangement—at best, for the entire detector arrangement—is arranged between the focusing element closest to the machining zone and the machining zone. This intermediate element is preferably designed as a deflection arrangement for the radiation—in particular, as a reflector arrangement or mirror. For special applications, the arrangement of several mirror segments located one below the other, or even of a curved, free-form surface as deflection arrangement, is advantageous. In order to achieve very large polar angles of the observation radiation beam beyond 10°, the inner surface of the lower edge region of the nozzle is, in particular, provided as an attachment point of the intermediate elements, or this edge region itself is designed as a deflection arrangement—specifically, as a reflector.

Another preferred embodiment of the invention provides for at least one detector arrangement, the observation direction of which is directed toward the machining zone in a range of the azimuth angle of at most 45° in relation to the movement direction of the nozzle and opposite its movement direction. In this respect, the term, "observation direction," also includes the central axis of a, for example, cone-shaped, observation radiation beam of the detector arrangement. With this embodiment, the "trailing" observation of the machining zone is in any case ensured, wherein, particularly in cutting processes of plates of at least 8 mm thickness, the rear or lower region of the machining zone or of the cutting gap can be observed, which region is located behind or outside the region coaxially visible through the nozzle.

Each group of detector arrangements arranged about the optical axis preferably comprises at least five—in particular, at least eight—detector arrangements. These detector arrangements are, advantageously, positioned—evenly distributed, circumferentially—about the optical axis of the arrangement and ensure a sufficient circumferential resolution in the azimuth direction.

Another advantageous embodiment of the invention provides that at least one detector arrangement have a detector and at least one arrangement with an intermediate optical element—preferably, a deflection arrangement. In this case, at least one of the detectors is designed such that it has a fan-shaped observation radiation beam with respect to the polar angle, and the arrangement of the intermediate optical elements assigned to a specific detector deflect segments of the fan-shaped observation radiation beam of this detector that are different with respect to the polar angle toward the same region of the machining zone. The term, "fan-shaped" radiation beam, is to express that the observation field of the detector arrangement, i.e., also called its observation beams, significantly differs in two orthogonal directions. Below, the terms, "intermediate optical element" and "reflector arrangement," "mirror," etc., are used in the same technical sense and can be exchanged for one another at will.

For the invention, several detectors or intermediate elements are preferably provided at substantially the same azimuth angle β about the optical axis, and their observation directions are directed toward the machining zone at different polar angles. Alternatively, one detector or one deflection arrangement can also oscillate at substantially the same azimuth angle β about the optical axis between different polar angles and respectively orient the observation direction at different polar angles toward the machining zone.

Another embodiment can be characterized in that several deflection arrangements are arranged—preferably, evenly distributed about the optical axis—at different azimuth angles β.

A laser-machining device according to the invention can also advantageously be designed such that at least one of the detector arrangements comprises a detector and at least one intermediate optical element, which deflects towards the detector the entirety of the radiation emitted by the machining zone at a certain polar angle. To this end, the intermediate elements are preferably designed as a reflector arrangement.

Another alternative embodiment of the laser-machining device is characterized in that the detector arrangements comprise coupling points, arranged in a ring shape about the optical axis for the radiation in radiation-guiding arrangements or other deflection arrangements, as well as detectors positioned at a distance from the coupling points or the other deflection arrangements. In this case, a geometric arrangement is once again advantageously selected, in which the coupling points for the radiation from the machining zone are arranged along at least one circle coaxial and substantially orthogonal to the optical axis. Possible in this case are also several circles located one above the other for these coupling points, just as they are also possible for the detector arrangements themselves.

Photo detectors for the detector arrangements, which are designed, in particular, as photodiodes, thermopiles, or line sensors, are advantageously used as radiation detectors.

The detector arrangements are preferably sensitive to at least two different wavelength ranges and/or radiation types—preferably, to wavelength ranges between 0.7 and 1 µm and/or between 1.45 and 1.8 µm. This can be achieved by the design of the detectors themselves, as well as, for example, by spectral filters in front of the detector arrangements, or at least in front of the actual detector itself. In this way, particularly narrow-band, and thus particularly meaningful measurements are also possible.

In order to optimize the imaging quality of the detector arrangements, aperture arrangements—in particular, slit apertures—can be arranged in front of the detectors or in front of the intermediate elements.

In an alternative embodiment of the laser-machining device according to the invention, at least some detectors and/or at least some intermediate elements can advantageously be inserted into the nozzle or formed therein. This is particularly advantageous for intermediate elements in the form of reflector arrangements—in particular, of mirrors or mirroring regions of the inner nozzle wall. In this case, the arrangement for producing and guiding a working laser beam and the nozzle are, preferably, separately connected to each other.

All features mentioned above contribute to radiation from an extended region of the cutting gap, i.e., at large polar angles in relation to the optical axis, being detectable, in order to better detect relevant quality parameters of the cutting process.

As a complement to the previously explained laser-machining device according to the invention for the preferably online process control of laser machining processes—in particular, of laser flame cutting processes—a detector with an observation direction parallel to the optical axis and an intermediate optical element can, advantageously, additionally be provided. In this case, the detector is preferably positioned on the side of the focusing element facing away from the machining zone. Also preferred in this case is the positioning of the intermediate optical element between the focusing element and the machining zone—if possible, inside the nozzle. However, it is, once again, of essential importance for the invention that the intermediate element here also deflect the observation direction of the detector for at least one azimuth angle β to a polar angle larger than 5° in relation to the optical axis of the working laser beam in the direction toward the machining zone. Polar angles of greater than or equal to 7°—in particular, polar angles of approximately 10° or more—are preferably used.

For this complemented laser-machining device, a preferred embodiment provides that the intermediate element deflect the observation direction of the detector in a range of the azimuth angle β of at most 45° in relation to the movement direction of the nozzle and opposite its movement direction toward the machining zone. It is provided in this case that the intermediate element deflect the radiation from the machining zone at least at different polar angles—preferably, also at different azimuth angles β—toward the detector oriented in parallel to the optical axis.

Preferably provided is also a laser-machining device, in which the detector arrangement comprises an additional detector, which is arranged next to the working laser beam and in front of the focusing element with respect to the propagation direction of the working laser beam, and the observation direction of which extends, at least after the focusing element, obliquely to the optical axis of the working laser beam toward the machining zone. Particularly advantageous for such a device is the optical axis of the detector extending obliquely to the optical axis of the working laser beam. In this way, imaging errors of the detectors—in particular, of cameras—can be eliminated relatively easily.

Another alternative is characterized in that the optical axis of the detector extends in the propagation direction of the working laser beam substantially in parallel to the optical axis of the working laser beam in front of the focusing element and obliquely toward the machining zone after the focusing element, after deflection by this element.

Within the framework of the invention, it can also be provided that the observation direction of the detector arrangement be oriented in the direction opposite the movement direction of the nozzle. In this case, the detector arrangement can preferably be moved in the circumferential direction about the working laser beam and/or the observation direction can take different polar angles.

Lastly, another embodiment of the complemented laser-machining device is characterized in that the observation direction of the additional detector extends at a polar angle of greater than or equal to 2° in relation to the optical axis of the working laser beam—preferably, at a polar angle between 2° and 4°—at least after the focusing element.

Additional advantages, features, and details of the invention result from the following description, in which exemplary embodiments of the invention are described with reference to the drawings. In this respect, the features mentioned in the claims and in the description can be essential for the invention, individually or in any combination.

The list of reference symbols is part of the disclosure. The figures are described coherently and comprehensively. The same reference symbols refer to the same components; reference symbols with different indices indicate components which are functionally identical or are similar.

Figure 2:
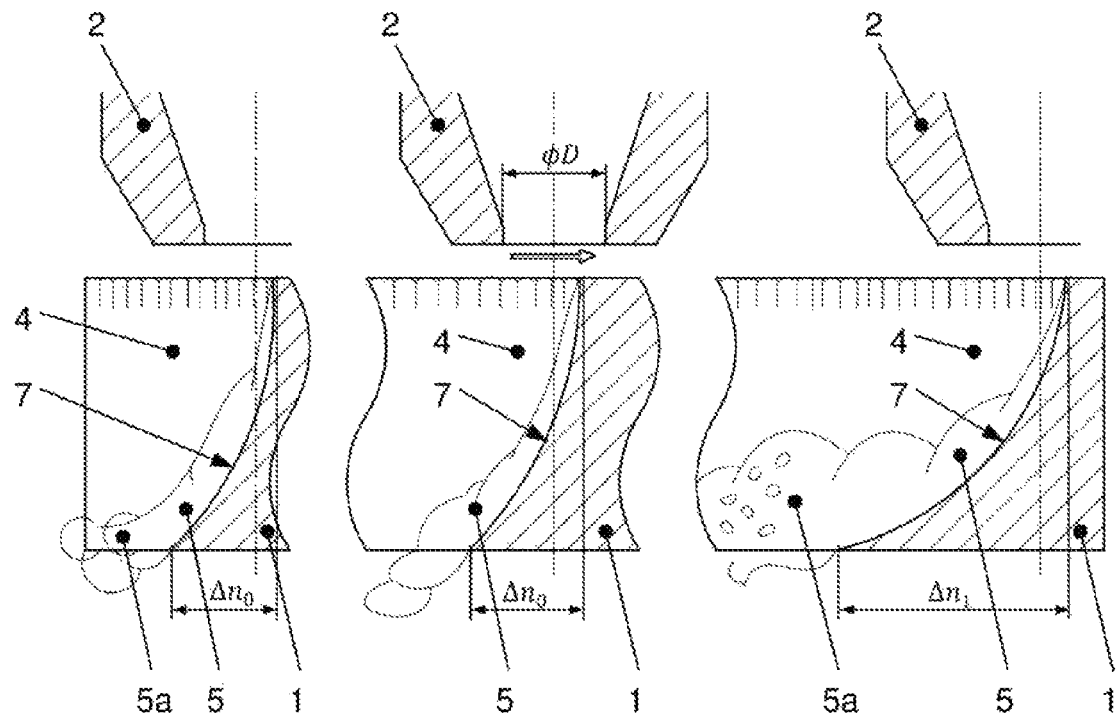
Figure 3:
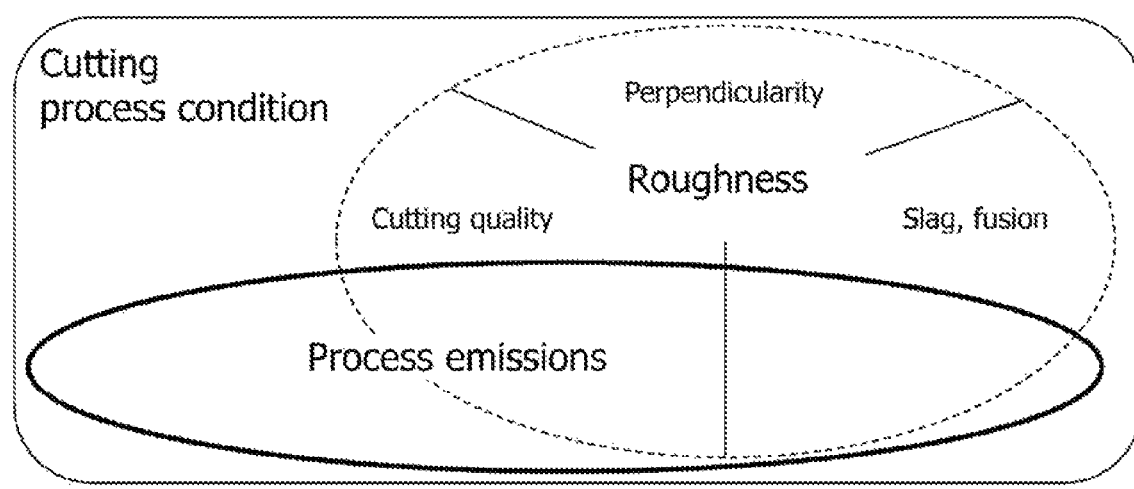
Figure 4:
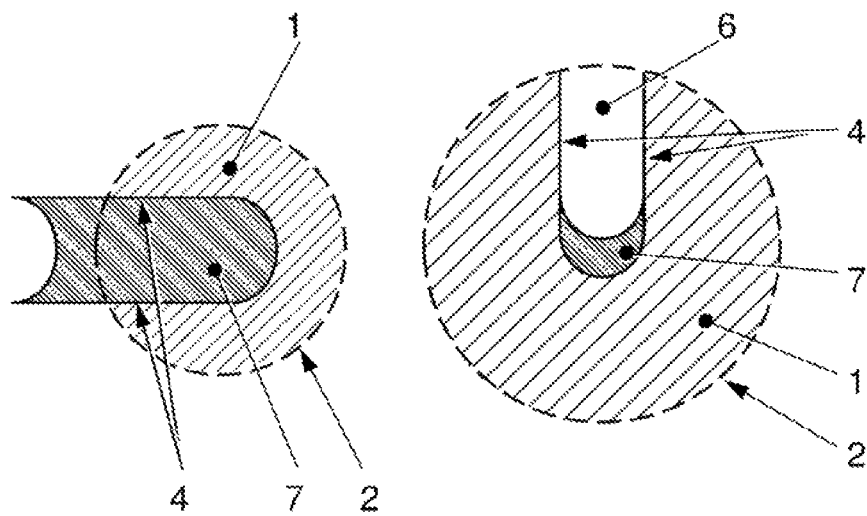
Figure 5:
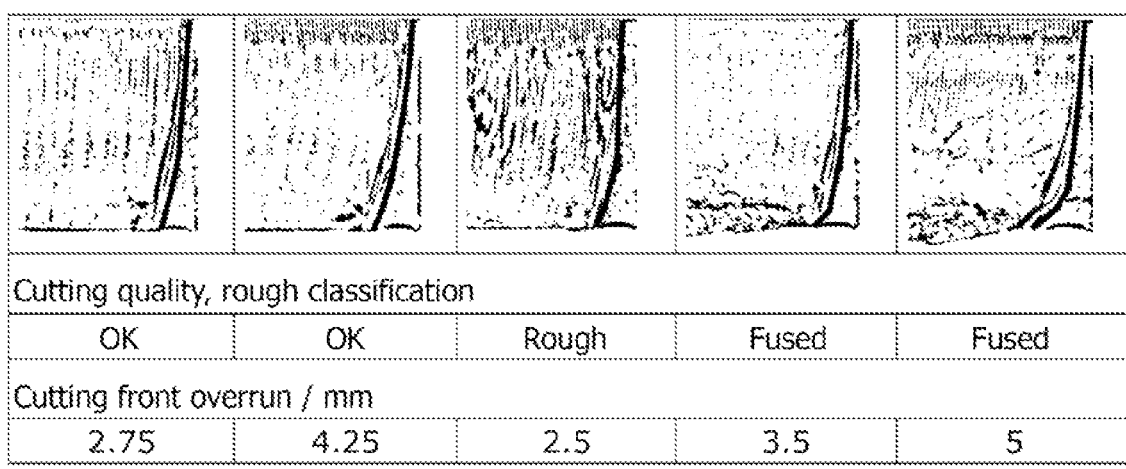
Figure 6:
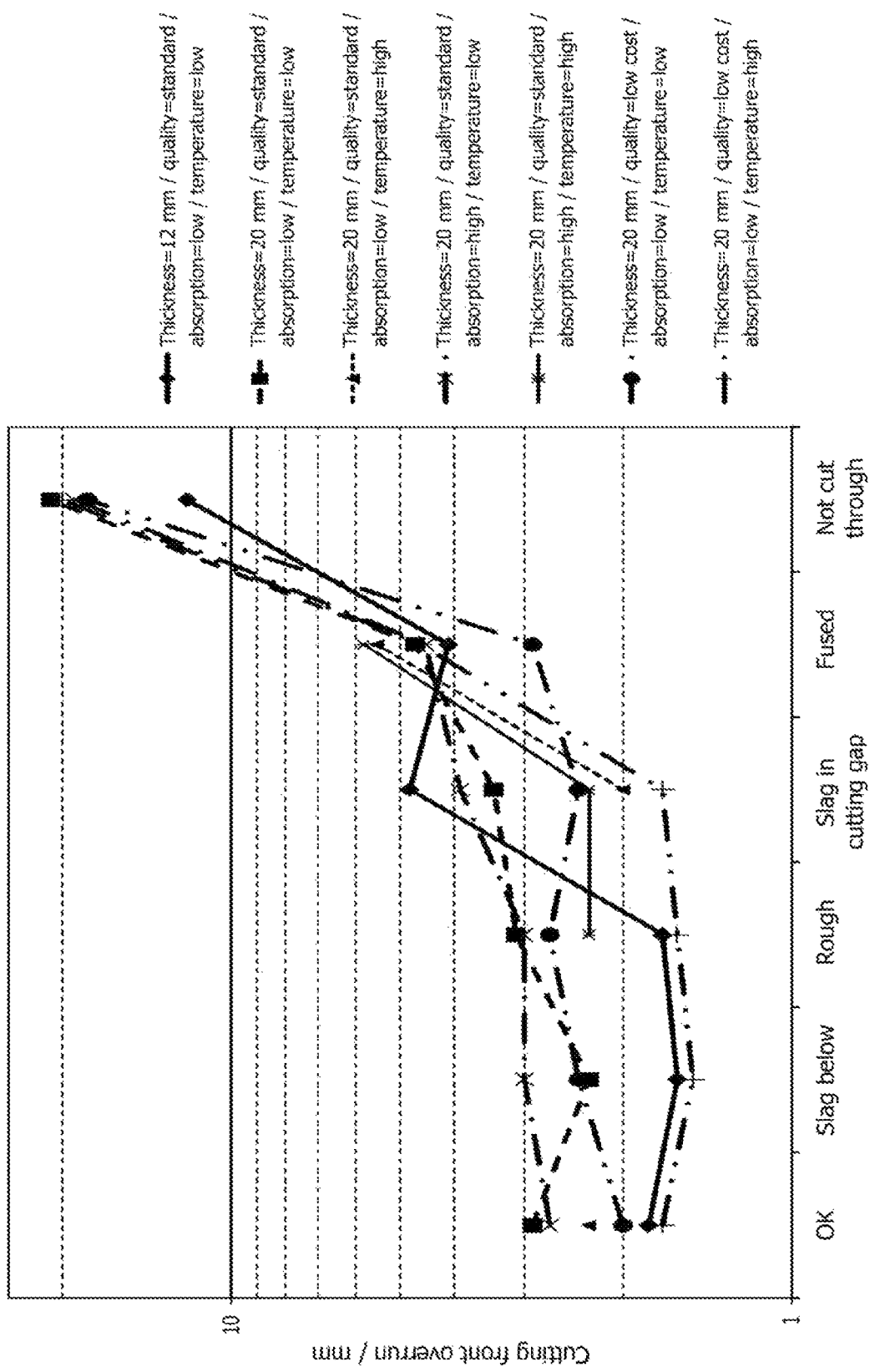
Figure 7:
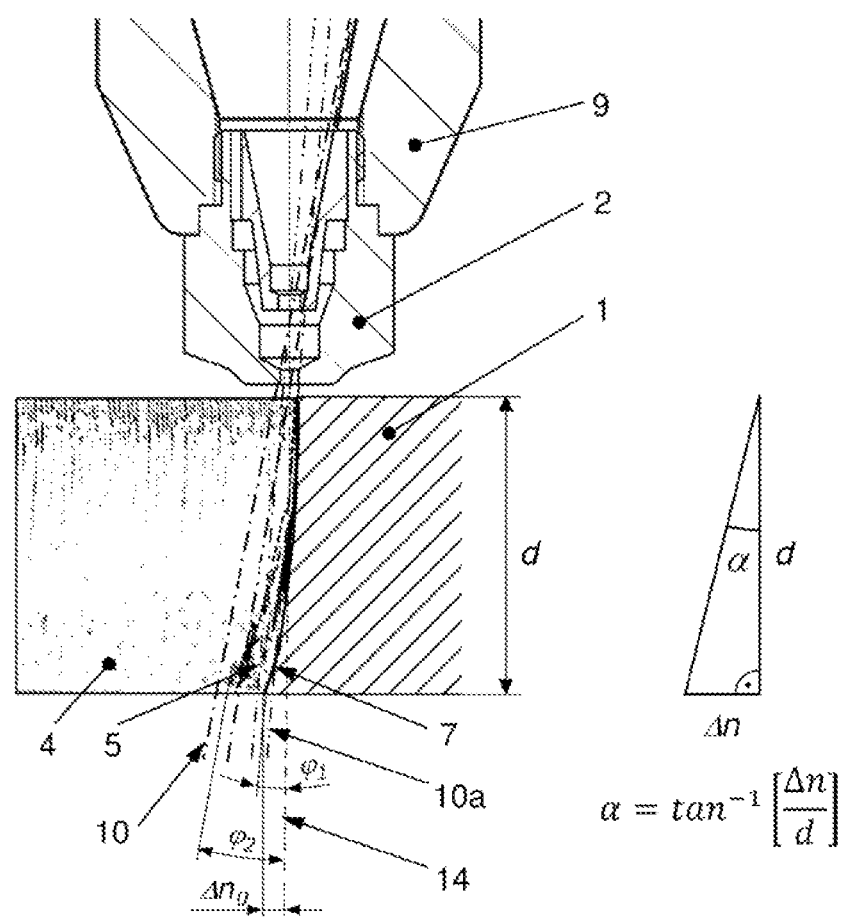
Figure 8:
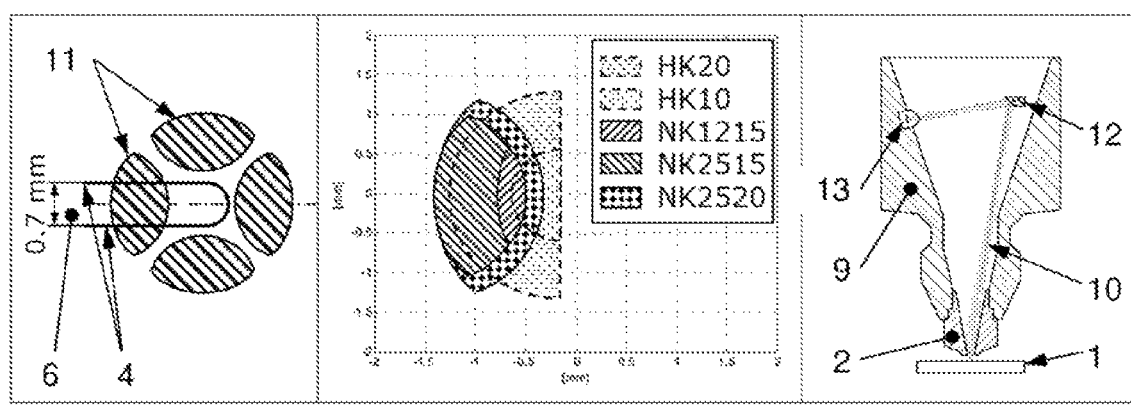
Figure 9:
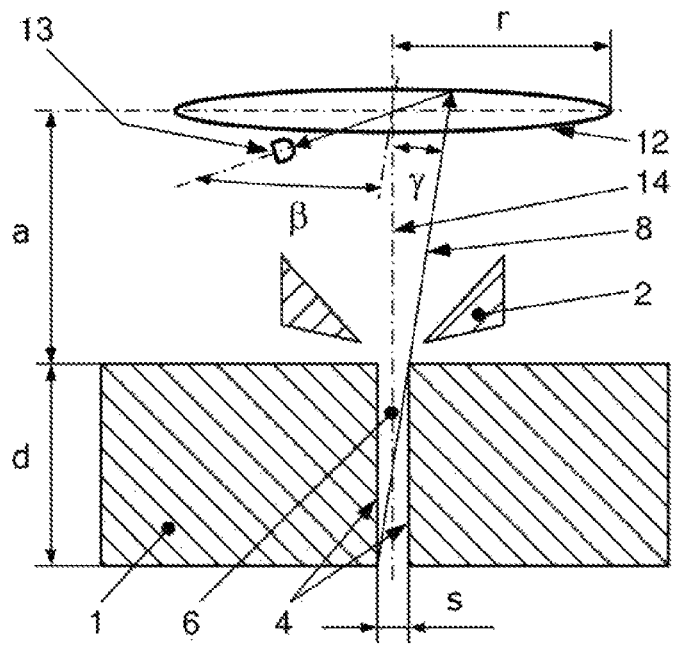
Figure 10:
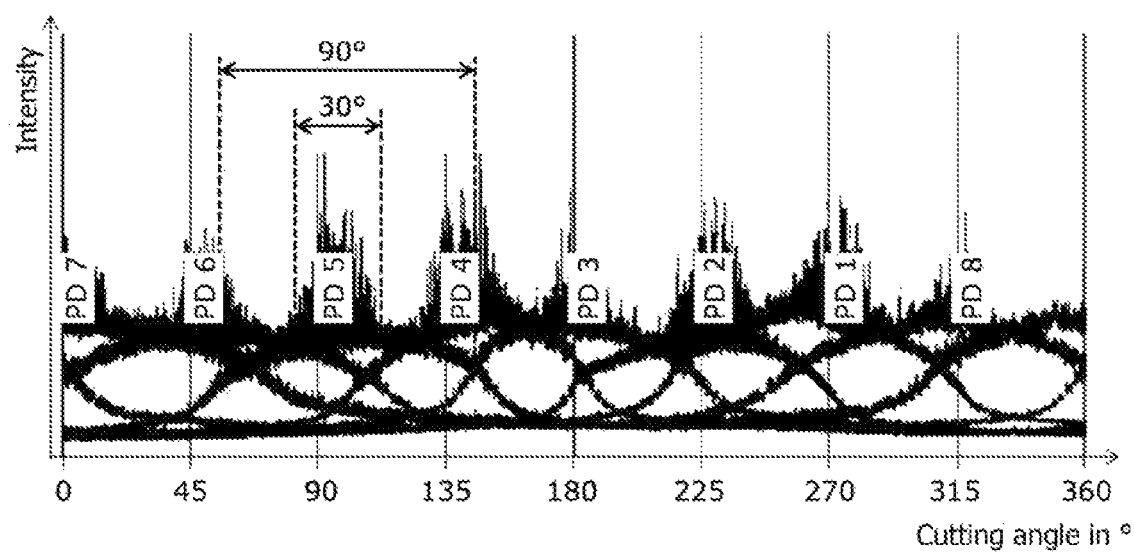
Figure 11:
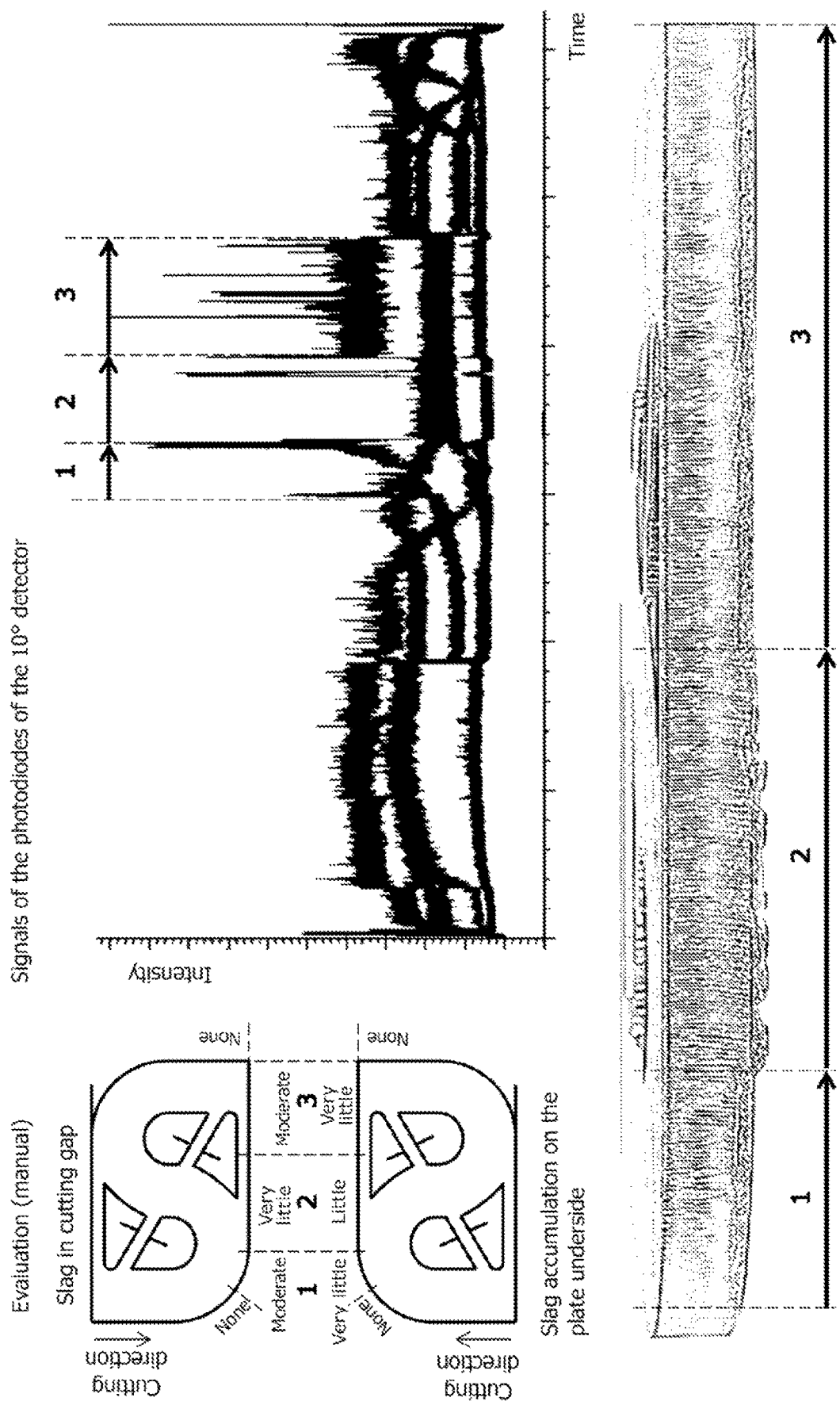
Figure 12:
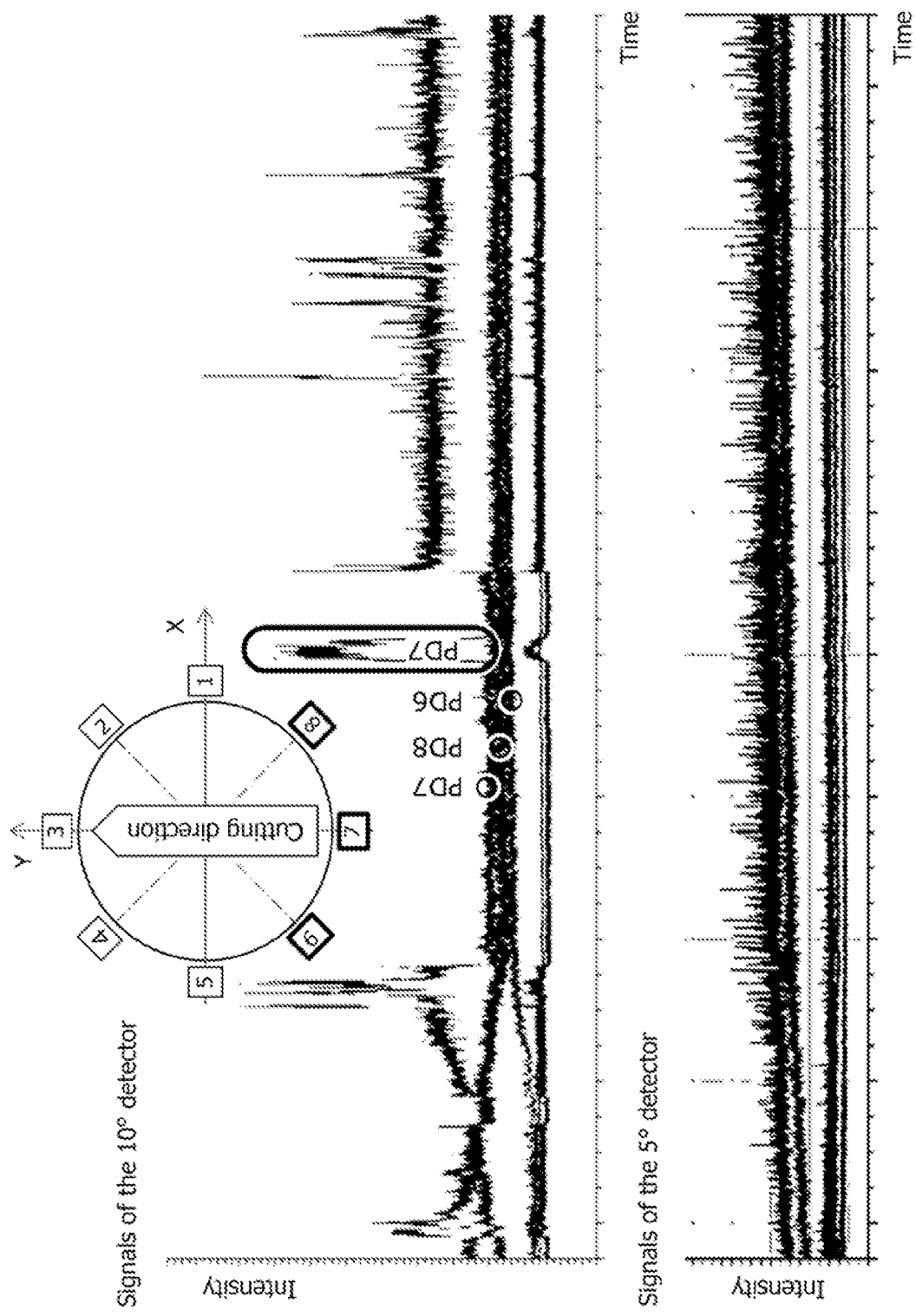
Figure 13:
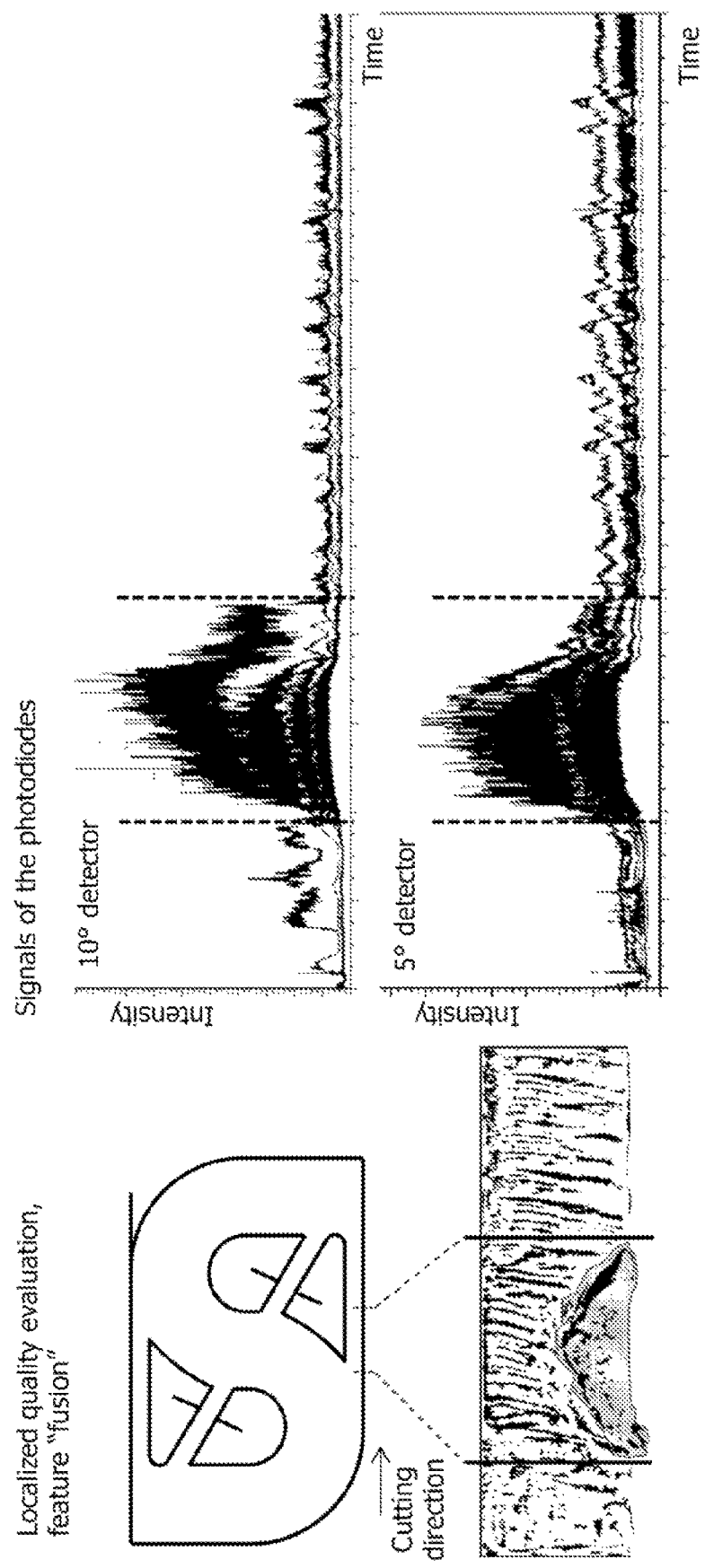

Shown are:

FIG. 1 the influencing factors and quality features in laser cutting,

FIG. 2 a flame cutting process in various qualities, schematically,

FIG. 3 a diagram regarding the correlation between cutting process condition, cutting quality, and process radiation, FIG. 4 coaxial camera images of laser cutting processes, FIG. 5 illustrations of cut surfaces and cutting fronts of samples of differing cutting quality, FIG. 6 the correlation of average value of the cutting front overrun to quality class, FIG. 7 a section through a cutting front with indicated molten film, as well as the beam path of a detector with a large polar angle according to the invention and with a small, traditional polar angle, FIG. 8 the fields of vision of four photodiodes below the cutting nozzle on the left side, the fields of vision for a photodiode with different cutting nozzles in the middle, and a simulation with scattered light on the right side, FIG. 9 a schematic illustration of the geometric relations for the borderline case of direct sight downwards into the cutting gap, including the calculation of the critical angle β between the cutting direction and the diode axis, FIG. 10 a diagram with the signals of eight photodiodes when cutting a full circle, FIG. 11 a graphic regarding the correlation of the detector signals of a 10° detector with slag residue in the cutting gap, FIG. 12 a comparison of the signals of the 10° and 5° detectors with slag residue in the cutting gap, FIG. 13 the relations in case of a temporary cutting interruption with a comparison of the signals of the 10° and 5° detectors.

Figure 14:
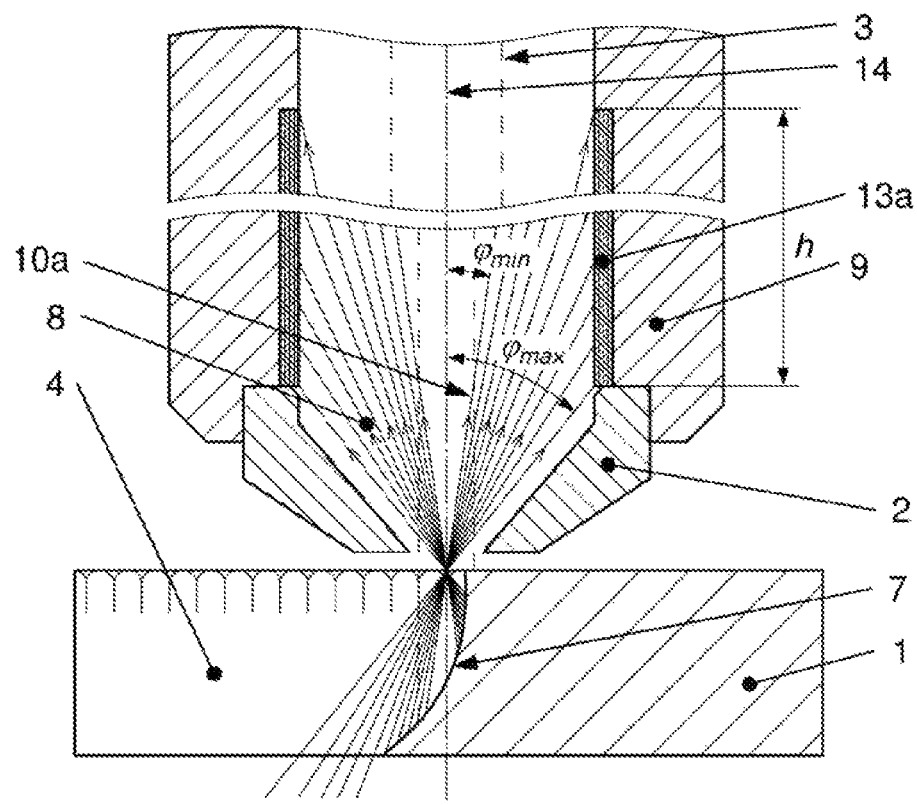
Figure 15:
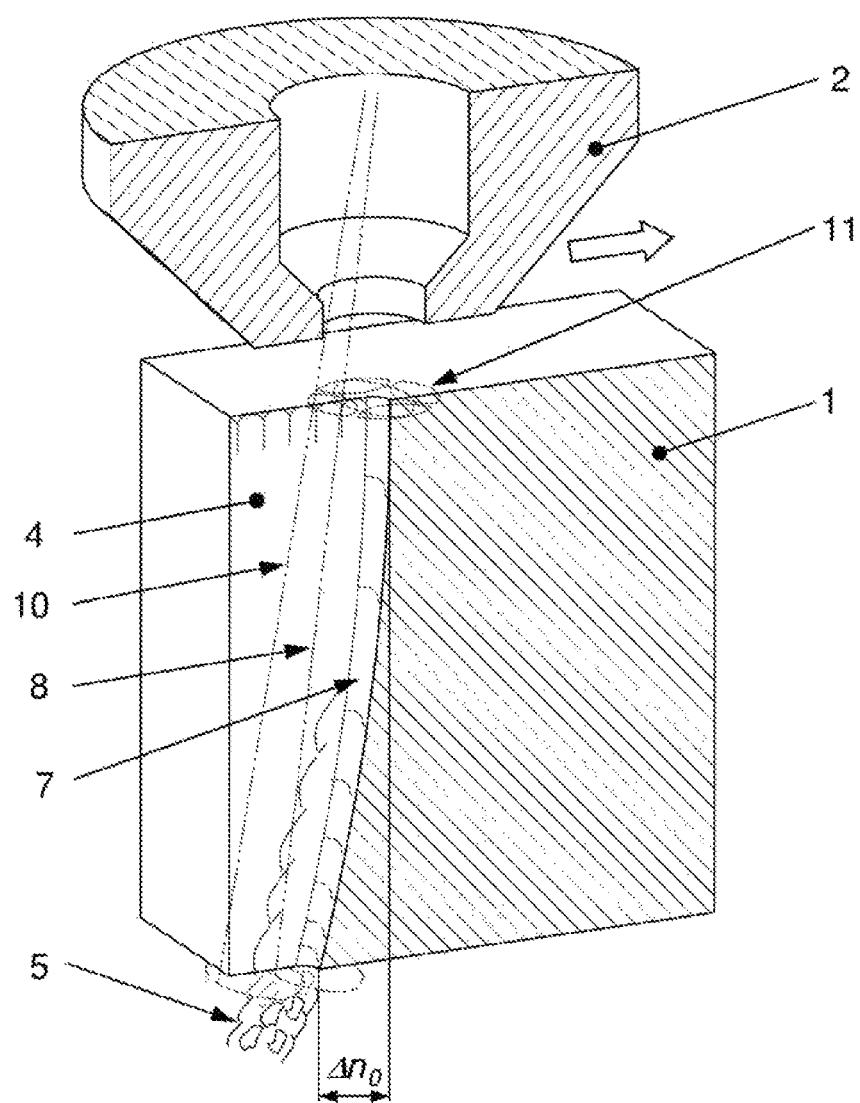
Figure 16:
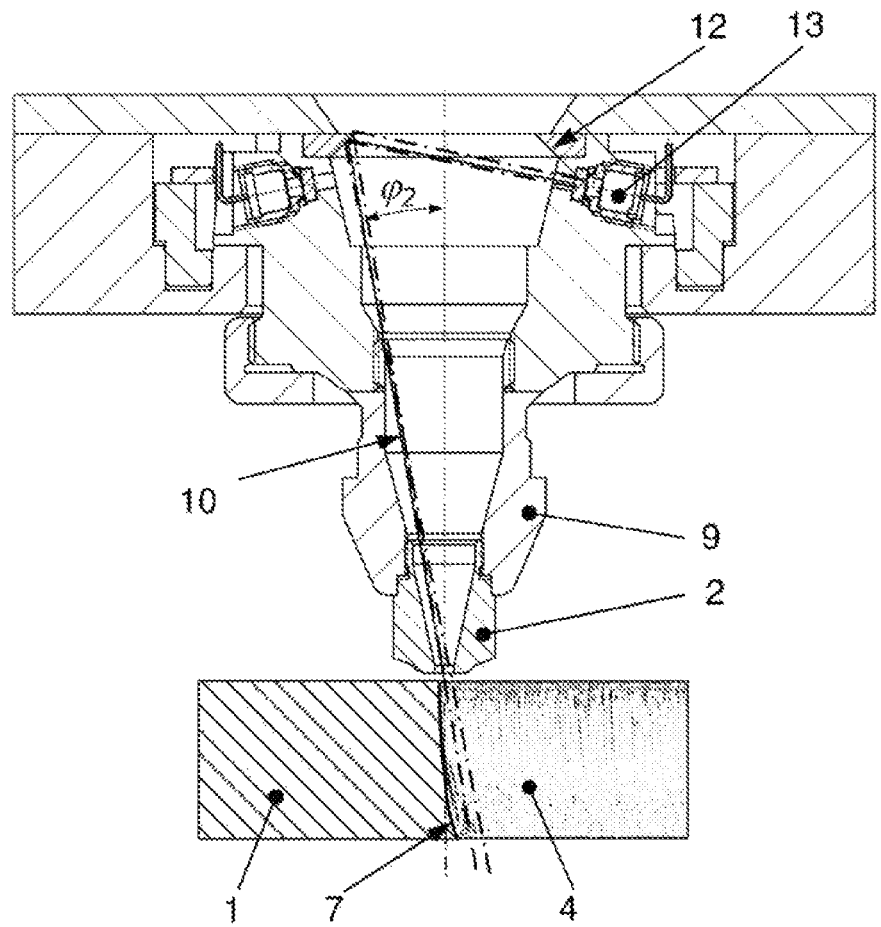
Figure 16:
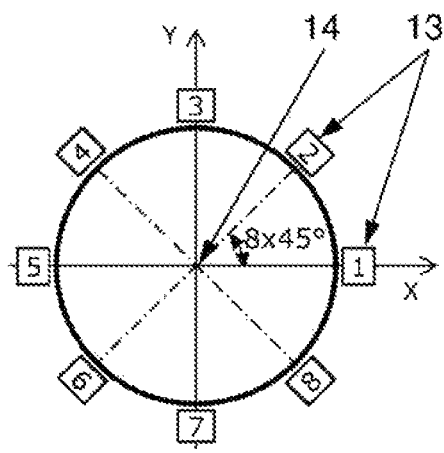
Figure 17:
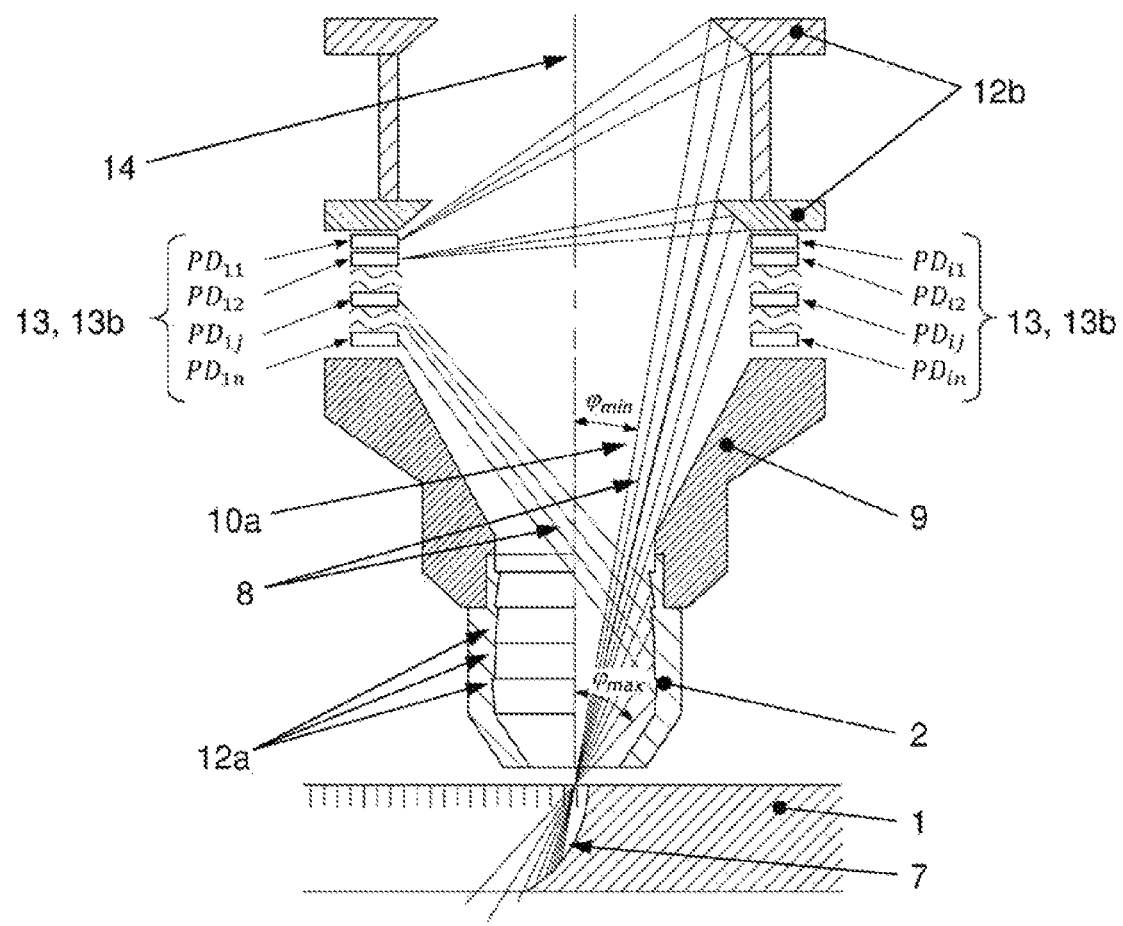
Figure 18:
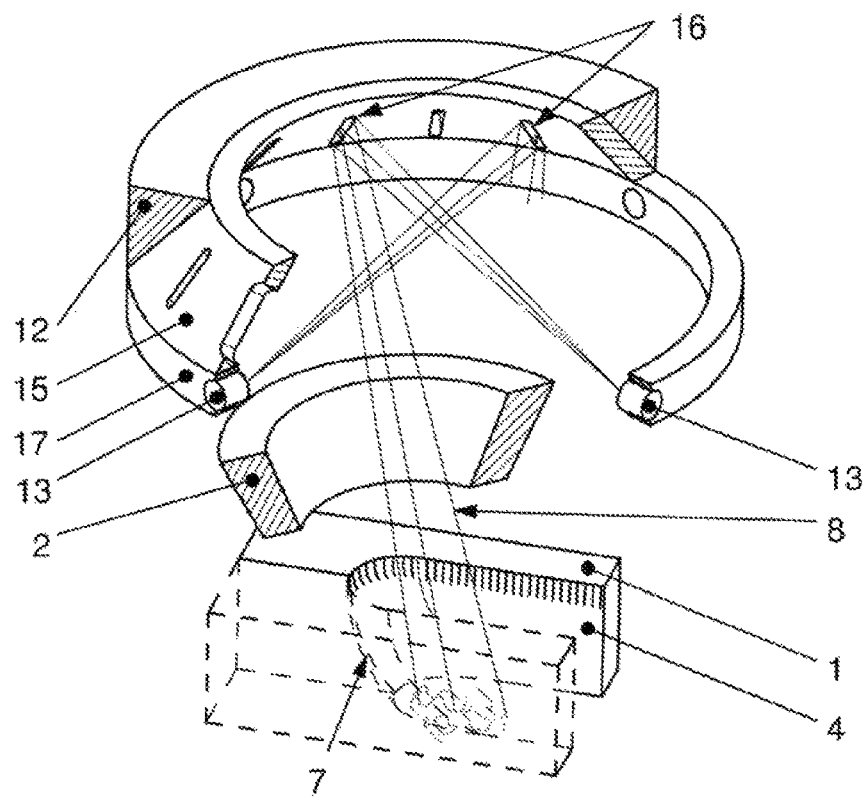
Figure 19:
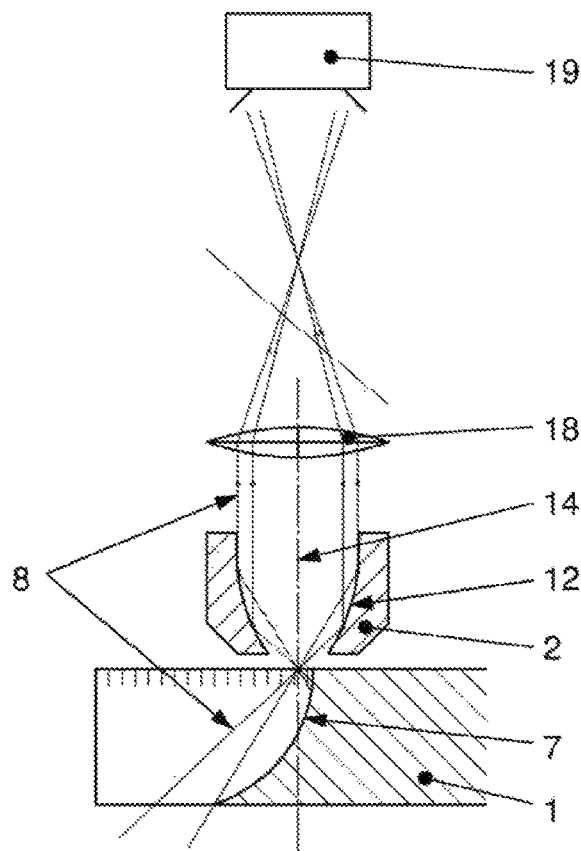
Figure 20:
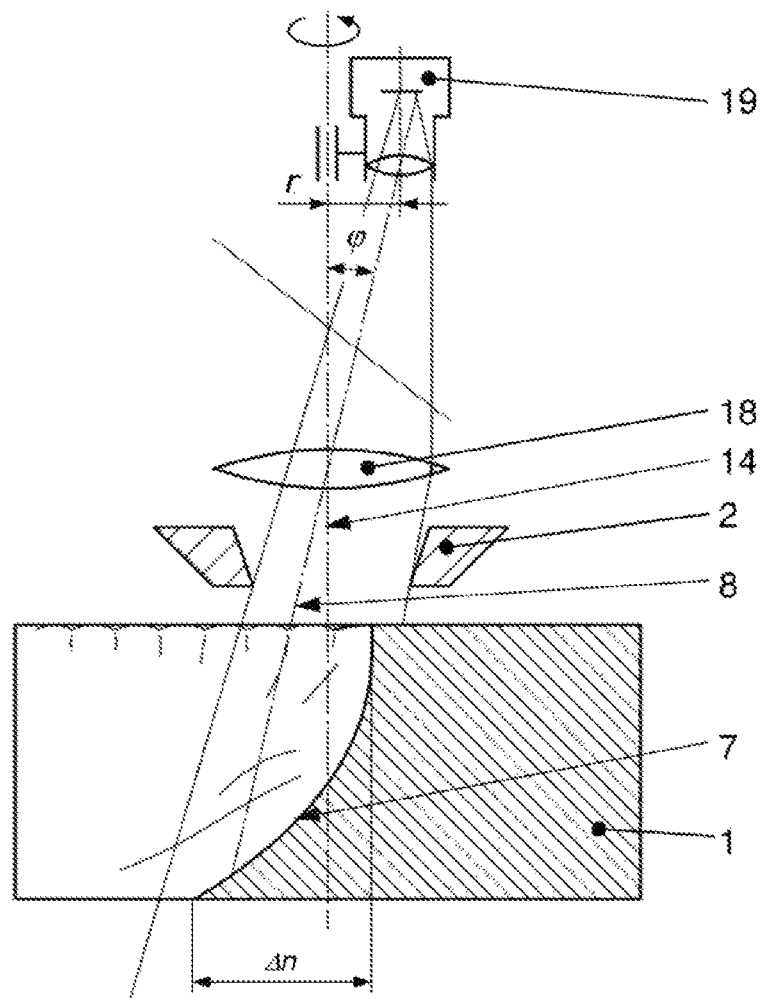

FIG. 14 a schematic sectional view through the emission region of the laser beam of a laser cutting head and the entrance region of the process radiation, FIG. 15 an overview of the fields of vision of various detectors toward the cutting front, and, in the right part of the illustration, their projection onto the surface of the workpiece, FIG. 16 an exemplary detector structure with conical mirror and eight photo detectors distributed over the circumference, FIG. 17 another embodiment of a detector arrangement according to the invention, with several mirror surfaces and a cylindrically-arranged detector array, FIG. 18 a detector structure according to the invention, with conical mirror and slit apertures, FIG. 19 a schematic illustration of an arrangement for imaging the lower and upper region of the process zone onto a camera via free-form mirror surfaces, and FIG. 20 a schematic illustration of an arrangement for eccentrically imaging the lower region of the process zone onto a camera.

For observing and controlling laser machining processes, highly specialized devices and methods are used, which must be closely oriented to the properties of the respective process (welding, cutting, drilling, etc.). This is, in particular, the case in laser flame cutting. The person skilled in the art knows that the prior art so far mainly includes solutions for laser welding, but not functioning and specialized solutions for laser cutting—in particular, not for laser flame cutting.

The important physical aspects with respect to a process monitoring of laser flame cutting are, therefore, listed below. In doing so, it will be shown that a detector arrangement designed for laser flame cutting also has crucial advantages for laser fusion cutting.

A plurality of publications regarding the laser flame cutting process and its theory exists. At this point is mentioned only the already long-standing, but very good, publication, Arata, Y., et al.: "Dynamic Behaviour in Laser Gas Cutting of Mild Steel," Transactions of JWRI, Vol. 8 (1979), No. 2, pp. 175-186, which illustrates some peculiarities and correlations very clearly.

As shown in FIG. 1, the laser cutting process depends upon a plurality of influencing factors. Some influencing factors are provided externally, e.g., the material quality of the workpiece 1 or the beam quality of the laser beam 3 emitted, preferably, through the opening of a nozzle 2. Other influencing factors, such as the laser output, can be adapted by the CNC control such that the cutting process runs under optimal conditions, if possible. They are called process parameters. By means of an online measurement of process radiation, signal characteristics correlating with the cutting quality are calculated using algorithms (arrow P).

The result of interest of the laser cutting process is two cut surfaces 4 which have a certain cutting quality. The cutting quality can be subdivided into different features. In addition to the features of perpendicularity and roughness, slag residue 5a (FIG. 2) can also occur as a quality defect when laser flame cutting with the cutting gas, oxygen. The slag residue is to be avoided if possible, since defective parts may otherwise be produced.

The emissions from the process zone, such as radiation or sound, contain information about the condition of the cutting process. The process radiation is preferably detected at suitable positions in the cutting head by detectors. From the detector signals, characteristics correlating to the various features of the cutting quality are calculated using suitable algorithms.

With good cutting quality, the molten mass 5 or slag is completely discharged from the cutting gap 6 or from the machining zone or cutting front 7. If the discharge is impaired, slag 5 can adhere to the lower cutting edges or remain in the cutting gap 6, depending upon the severity level. A significant development of slag residue 5a happens when the plate 1 fuses again in the lower cutting kerf region. The most severe manifestation is a process interruption, when the laser beam 3 no longer completely cuts through the plate 1.

The middle section of FIG. 2 shows a flame cutting process of good quality, with the slag film flowing off of the cutting front 7 (solid/liquid interface). In case of a bad setting, almost all influencing factors can impair the cutting quality, i.e., either result in a rough cut or impair the discharge of the molten mass. The error patterns of the slag residue 5a are correspondingly varied. The ratio of the nozzle diameter (ØD) to the cutting front overrun ($\Delta n_0$) is illustrated realistically. The process condition shown on the left side of FIG. 2 shows an impaired discharge of the slag as a result of an incorrect setting of the focal position, for example. According to experience, the cutting front overrun can, however, still be as large as in a faultless process. In contrast, the process condition shown on the right side of FIG. 2 shows a very large cutting front overrun ($\Delta n_1$), which can develop, for example, in consequence of a feed rate that is too high. The slag residue 5a, or the re-fusion of the two cut surfaces, is correspondingly large. In the extreme case, a cutting interruption occurs.

The physical cutting process condition requires a plurality of state variables for its description as a function of time. As can be seen in FIG. 3, a subset thereof describes the cutting quality; another subset is visible in the process radiation in the cutting head. These two subsets intersect, but are never congruent. Depending upon the type of the detected process radiation and upon the location of the detectors, various quality features are more or less visible. These theoretical explanations apply to both photo detectors and cameras. In addition, the detected process radiation also always contains information not reflected in the cutting quality.

So far, detectors are mostly used which detect the radiation from the process zone coaxially or concentrically (and in parallel) to the machining laser beam 3, by means of either photo detectors or cameras. In doing so, the process radiation is decoupled from the beam path of the working laser beam 3 after the focusing optics by means of dichroic mirrors or deflection aperture mirrors or scraper mirrors. Due to the large distance of the focusing optics from the process zone and the cutting nozzle 2, its small opening virtually limits the field of vision to the nozzle diameter, and the angle spectrum of the detected radiation is <5° due to the aperture of the focusing optics. This causes limitations for the observation of the laser cutting process, which limitations are shown with reference to two images of cutting fronts illustrated in FIG. 4. The images were captured during the cutting by means of a coaxially-arranged camera. The right cutting front 7 (outlined continuously) originated from a laser fusion cutting process. It is very steep and is thus shown significantly shortened. This means that much information of the upper region of the cutting front 7 is lost. The ability to observe the formation of striations, which develop on the side walls 4 directly after the cutting front 7, is also significantly limited as a result of the shortened coaxial imaging. Only precisely the structure of striations that can be seen at the upper edge of the cut 6 can be analyzed. In contrast, a flat cutting front 7, as shown on the left side of FIG. 4, develops during laser flame cutting. This flat cutting front is never completely coaxially visible through the nozzle 2, except with a nozzle 2 that is much too large for adequate process control (the opening of the nozzle 2 is shown dashed). The bottom part of the cutting front 7 remains hidden, even though slag residue, which is the cause of defective parts, develops precisely there in the case of a bad process condition.

The adaptation of the detector to the large cutting front overrun $\Delta n$ typical of flame cutting has proved advantageous in being able to—in particular—detect slag residue. This means that the detector can detect radiation from the lower region of the cutting front, where slag residue can occur, as a result of the design according to the invention. The advantages of such a detector for the fusion cutting process are, however, also obvious. Much more radiation from the upper region of the cutting front, which is coaxially only visible in a much shortened manner, and from the emerging cut surfaces can be detected by means of the detector arrangement according to the invention, whereby, in particular, the formation of striations, and thus the roughness of the cut surface, can be detected. The correlation between the cutting front overrun and the cutting quality is shown first below. Then, the essential properties of a suitable non-coaxial detector are explained and, lastly, it will be shown with reference to two examples how the signals of the detector according to the invention correlate with slag residue.

In tests, cutting samples with different cutting quality were produced by varying influencing factors and process parameters. Some samples of 20 mm steel are shown by way of example in FIG. 5, wherein their cut surface and the cutting front can be seen. The cutting front overrun for good cutting quality in this case is 2.75 mm, or even (a large) 4.25 mm. The latter occurred in a cut with increased cutting lens absorption. The two right cutting samples show slag residue and fusion, both in a moderate cutting front overrun of 3.5 mm and in a larger one of 5 mm. FIG. 6 shows the curve of the cutting front overrun as a function of the cutting quality class for several test series, wherein the plate thickness and quality, the sample temperature, and the absorption of the cutting lens were varied. The cutting quality classes are sorted by decreasing quality, beginning on the left with good quality, "OK." One peculiarity of the classes with slag residue must be pointed out: A cut belonging to the class, "fused," also shows slag residue in the cutting gap. If, however, slag residue occurs in the cutting gap without fusing, the samples are listed in the class, "cutting gap slag." The lightest quality defect with respect to slag is when slag adheres only to the underside of the plate. This case results in defective parts in the fewest cases. For the case of a process interruption (class, "not cut through"), the cutting front overrun was set per definition to plate thickness, even though it actually increases infinitely in this case. It has been shown that the correlation of the cutting front overrun and the cutting quality is, in general, only weakly correlated. However, the cutting front overrun does indeed correlate with slag residue—in particular, under the same environmental conditions, e.g. with the same material. A very large cutting front overrun also always leads to slag residue 5a in the cutting gap 6 and to fusion. However, significant slag residue 5a can, under some circumstances, already occur with a small cutting front overrun, and, vice versa, a slag-free cut can still be achieved with very high overrun, which is why an online measurement of only the cutting front overrun is not expedient.

The optical properties of the detector according to the invention are explained below, which detector is, in particular, to detect slag residue and is adapted to the aforementioned properties of the cutting front, or to the cutting front overrun.

The cutting front 7 shown in FIG. 7 of a cut in 20 mm steel with good cutting quality shows a minor cutting front overrun $\Delta n_0$ of approximately 2 mm, for example. In accordance with the simple trigonometric relation shown in FIG. 7, this corresponds to an average cutting front incline $\alpha$ of 5.7°. The cutting front 7 is shaped semi-circularly in a manner similar to a slide, and extends steeply at the top and increasingly more flatly toward the bottom. On this cutting front 7, which moves along in the cutting direction, the molten mass or slag 5 flows off toward the bottom. In the lower region of the plate 1, the slag flow is significantly thicker than in the upper region. Depending upon the process condition, the thickness and the discharge velocity of the slag flow 5 changes. If the slag flow is to be observed, and any abnormal conditions, such as slag residue 5a, are to be detected, the observation angle is crucial. For this purpose, it is not expedient to observe only the upper and center regions of the process zone 7, to which a coaxial system is limited; rather, the bottom region of the cutting front and of the slag flow must be observed. If all possibly occurring cutting front overruns as can be seen in FIG. 6 are taken into consideration, they are in a range of approximately 2 to 6 mm (with the exception of a process interruption). For a cutting front overrun of 4 mm, which almost always results in fusion, the average cutting front incline $\alpha$ is approximately 11°. According to experience, this corresponds to a good observation direction. It goes without saying that somewhat smaller cutting front overruns result for thinner plates, which is why the average cutting front incline for good cutting quality remains approximately constant.

Discussed below are the consequences that result for an observation direction of 10°, shown in FIG. 7 by the bounding lines of the radiation beam 10, which can be detected by a detector with a 10° polar angle through the cutting nozzle 2 of a laser cutting head 9, in comparison to an observation direction of 5°, shown with a radiation beam 10a, which can be detected by a detector with a 5° polar angle. It can be seen that the 10° detector looks toward the slag flow 5 in the bottom region, in the case of a normal cutting front overrun $\Delta n_0$. By means of the 10° detector, the change of the cutting front 7 in the lower region, or the cutting front overrun or any slag residue, can be observed specifically. In contrast, the 5° detector always looks toward the molten mass flow or the slag flow 5 in the upper and center region of the plate 1, even with a minimal cutting front overrun, which makes the ability to directly observe the slag residue impossible, as in the coaxial case.

Another important property of a detector is the signal's independence of the cutting direction, or, in the case of several individual detectors or of spatially-resolved imaging, the invariance of all individual signals with respect to a rotation about the optical axis, which is synonymous with a change in the cutting direction. If, for example, a full circle is cut, and the cutting process condition and thus the quality on the circumference of the cut workpiece are the same everywhere, the same (transformed or rotated) signals must always be measured. The necessity of this property is obvious and has been required in the prior art for a long time. Accordingly, technical solutions in this respect have also been known for a long time. For example, in the case of a detector arrangement with a single photo detector, all radiation impinging on the mirror in a defined polar angle range can be deflected onto a photodiode by means of a scraper mirror or a dichroic mirror, which is a requirement for the signal's independence of the cutting direction. According to experience, the information content of such a single signal is, however, not sufficient to be able to detect the essential quality features of a workpiece produced by laser flame cutting, even if two different wavelength ranges, such as visible light and near infrared, are measured, or even if a temporally highly resolved spectral measurement is carried out.

In order to eliminate the above serious disadvantage of a single detector, it is obvious, and part of the prior art, to observe the machining process using a camera in a coaxial arrangement as shown in FIG. 4. Using the spatially resolved information, a plurality of geometric features of the cutting front and the developing cutting kerf can be calculated by means of image processing. In this way, some quality defects, such as a rough cut, wide cutting gap, or uncontrolled burning off, can be detected and clearly differentiated. Nonetheless, no direct information about slag residue can be obtained from a coaxial camera image because, as mentioned above, the lower region of the cutting front cannot be seen in the image.

In contrast, the rear or lower region of the cutting front and of the slag flow can be observed directly by means of the detector arrangement according to the invention (FIG. 7), in order to directly draw conclusions about the slag residue. So that this works in any cutting direction, the radiation from the polar angle range typical of the invention must be detected azimuthally, i.e., in a spatially-resolved manner on the circumference, whereby an azimuthally-resolved image of the machining zone is made possible (left side of FIG. 8). This cannot be achieved by coaxial observation, but by an embodiment according to the invention, with a mirror that deflects the light onto several photodiodes distributed evenly over the detector circumference. In doing so, the spatial resolution is limited to the discretely provided detectors. Preferably used is a conical mirror, which provides satisfactory results, despite poor focusing. In particular, in connection with an arrangement of at least five—preferably, eight—photodiodes positioned—preferably, evenly distributed—about the optical axis of the working laser beam, the condition of integral decoupling, i.e., of detection of all radiation impinging on the detector mirror, can be achieved satisfactorily. Other mirror types and mirror shapes are also possible, such as a mirror with focusing segments.

The left side of FIG. 8 shows a graphic, with the fields of vision 11 of four photodiodes on the plate surface for a typical cutting nozzle. In this case, only direct light was taken into consideration. It can be seen that a single detector has an elliptical (geometric figure, limited by oval segments with different minor axis) field of vision, which almost covers a quadrant, on the plate surface. The entire circumferential region can, all the more, be covered without any gaps by five—or even better, eight—photodiodes. This means that the azimuthal resolution of the detected radiation increases. It is, however, notable that only one field of vision intersects the cutting gap drawn in to scale, viz., the field of vision of the detector looking backwards into the cutting gap. The other fields of vision are located next to the cutting gap on the plate surface. This fact is discussed further below with respect to FIG. 10. The middle section of FIG. 8 furthermore shows the fields of vision when using various cutting nozzles. Notable is that the inner cone hides the center region of the radiation in the shape of an arc in the case of a dual-cone nozzles (shown by way of example in FIG. 7) used in flame cutting, while single-cone nozzles look almost all the way into the center of the cutting gap on the plate surface. As the scattered light illustration on the very right side of FIG. 8 shows, a significant portion of the radiation is reflected on nozzle inner surfaces. Depending upon the nozzle type, the proportion of reflected light to direct light is approximately 30%, if the region below the nozzle 2 is illuminated evenly.

FIG. 10 shows that even the photodiodes that look laterally and forward toward the cutting gap can detect light from the cutting kerf, even in the case of the dual-cone nozzles used for flame cutting. The fields of vision of these photodiodes, which do not intersect the cutting gap anywhere, detect radiation reflected on the inner surfaces in the bottom region of the cutting nozzle, as suggested by the scattered light simulation. The radiation reflected in this way, as well as the direct radiation from the lower region of the cutting front, which is mainly detected by the photo detector looking backwards, are of crucial importance for obtaining information regarding the cutting quality features. It goes without saying that the detected radiation and the type of imaging are subject to many influencing factors (nozzle size, reflectivity of the nozzle surface, etc.), which are not described in more detail here and which, notably, do not occur in a simple coaxial imaging using a camera. These seeming disadvantages of the detector arrangement according to the invention are, however, eliminated by suitable evaluation algorithms, and the information regarding the slag residue 5a can thus be filtered out of the signals.

For the photo detectors looking backwards into the cutting gap, i.e., trailing, the upper cutting edge shadows the view backwards more or less depending upon the cutting direction, because of the deep and narrow cutting gap. From the geometric relations shown in FIG. 9 and from the formula also listed in FIG. 9, the theoretical critical angle β of the cutting direction to the diode axis can be derived. The optical axis of the optical elements for guiding the working laser beam—in particular, of the focusing optics closest to the workpiece 1—is denoted by 14. For a workpiece 1 with a thickness of 20 mm and a width of the cutting gap 6 of 0.7 mm, along with the measurements of an exemplary detector arrangement according to the invention with a circular conical mirror 12 (a=140 mm, r=12 mm) and at least one photodiode 13 as actual detector, a theoretical critical angle β of 26° results. If the cutting direction deviates by more than 26° from the observation direction of the photodiode, the lower end of the cutting kerf is completely shadowed. It follows that radiation from the lower end of the cutting gap 6 can be detected in any cutting direction, using an arrangement with eight photodiodes 13 in the case of the dimensions specified by way of example. A detector arrangement, equipped according to the invention with eight photodiodes as explained above, ensures the azimuthally-resolved trailing view backwards into the cutting gap and the cutting-direction-independent detection of slag residue. It goes without saying that a detector arrangement can also be equipped with more than eight photodiodes, whereby, at the same time, more than one photodiode obtains a direct view backward into the cutting gap. This can be advantageous for the algorithmic evaluation of the signals. It goes without saying, however, that a detection of slag residue can also work with less than eight photodiodes—in particular, in the case of smaller detector dimensions a and r, or if the detection must work in only one or few cutting directions.

FIG. 10 shows the signals resulting for a full circle of the 10° detector according to the invention. Hence, the trailing, i.e., backwards-oriented, photodiode 13 sees direct light from the cutting front 7 and from the slag flow 5 in the bottom region of the cutting kerf in a range of approximately 30° or +/−15° in relation to the cutting direction. In this region, the signal shows a significantly increased level, which, however, depends upon the cutting speed and other influencing factors. The signal dynamic in this region is also very large, which is caused by the high molten mass dynamic. This region expands when the cutting gap 6 becomes wider. In the extended range of 90°, the photodiode still looks directly into the cutting kerf, but only towards the side walls. In this range (±45°), the approximately elliptical field of vision 11, shown in FIG. 8, of the photodiodes 13 still intersects the cutting gap. Outside of this range, the photodiode sees nothing but reflected light, and the signal level drops significantly. The reflected light is then a mixture of various components.

Below, the detection of sporadically occurring slag residue 5a in the cutting gap 6 by means of the photodiode 13 of the 10° detector is to be explained in connection with FIG. 11. If the slag 5 accumulates in the cutting gap 6, a significant jump in the trailing signal is seen, in contrast to a cutting gap without slag, or to a slag accumulation on the plate underside. Depending upon consistency and residue height, the slag residue 5a definitely results in defective parts, even if the worst quality defect of complete fusion or the cutting interruption has not yet occurred.

As FIG. 12 demonstrates, the development described above of slag residue 5a is invisible to a 5° detector. From all previous explanations, it also follows that this development of slag residue cannot be detected by coaxial observation—neither by means of a photo detector nor using a camera. Notable is that, with a 10° detector, precisely the trailing, backwards-looking photodiode exhibits a significant signal jump, while the directly adjacent photodiode does not register any intensity increase. This can be explained on the basis of the aforementioned property, according to which these photodiodes still detect direct light only from the side walls 4 of the cutting gap 6 directly behind the cutting front 7, which are not impaired by the still moderate slag residue here. This fact can be utilized well by means of suitable algorithms for the detection of slag.

If a cutting interruption occurs, it also shows in the signals of traditional, nearly coaxial 5° detectors and in truly coaxial systems, as shown in FIG. 13. However, if only a single photo detector is installed, and if no reference cut is used as a basis, even in case of this worst defect, pseudo-errors can occur, because other effects, such as increased cutting speed or wide cutting gap, of similar magnitude can interfere.

The features of the detector arrangement according to the invention with 10° polar angles can be generalized. As shown in FIG. 14 in a very simplified manner, all of the radiation 8 that enters through the nozzle at a large polar angle ≥5° in relation to the optical axis 14 can be detected. Where applicable, the polar angle range can also be limited, e.g., to ≥7°, or, as in the arrangement described in detail above, to approximately 10°. For certain applications with a very elongated, flat cutting front, polar angles >10° can also be advantageous.

These detector features make it possible to observe regions of the cutting front 7 and of the slag flow 5 through the opening of the cutting nozzle 2, which regions are located far outside the optical axis 14, outside the field of view of a traditional coaxial system. In this way, additional information about the process condition can be obtained as described above, which information is invisible to a coaxial system, but is relevant to the prevention of defective parts. The radiation-sensitive detector surface 13a is shown cylindrically in FIG. 14. It is preferably located in the laser cutting head 9 between the focusing optics (not shown) and the cutting nozzle 2. Generally speaking, this surface is, however, to be understood as a spatial entrance surface of the radiation 8, behind which entrance surface any optical, mechanical, and electronic components are contained, in order to deflect, image, and detect the radiation.

On the basis of this fundamental principle, many variants can be provided for the specific embodiment of the detector arrangement, such as with direct irradiation of the actual sensors 13. The radiation 8 entering through the nozzle opening can be detected directly by means of one or more detectors 13 mounted on the irradiated surface. Depending upon the orientation and acceptance angle of the detectors 13, only the light from the opening of the nozzle 2 can specifically be detected, and undesired diffuse or direct reflections on inner walls of the machining head 9 can be eliminated. Several detectors 13 can be arranged on the circumference. As a result of the aperture effect of the nozzle opening, each detector 13 has its own field of vision 11 towards the process zone, as shown in FIG. 15. In particular, the detector 13 that looks backwards in the cutting direction receives radiation from the lower part of the cutting front 7 and, in particular, also from the glowing slag residue 5a, which remains in this lower region of the cutting gap in case of a bad process condition.

On the other hand, a deflection of the radiation onto the sensors 13 via one or more intermediate optical elements 12 is also possible. Advantageously, one or more mirrors can be used for the deflection, e.g., the aforementioned conical mirror, or lenses or prisms or gradient index lenses can also be used for the redirection, deflection, or focusing of the radiation 8. When using intermediate optical elements, the sensors can be accommodated at any point in the machining head 9—in particular, in the propagation direction of the working laser beam 3 either before or after its focusing optics—in particular, the last element of the focusing arrangement, which is located closest to the machining zone. An advantageous embodiment of the invention uses a deflection mirror arranged in a ring shape. The radiation from the nozzle opening in a defined polar angle range can thereby be specifically directed toward the detectors 13. Various mirror shapes are basically possible, wherein the simplest shape is a conical mirror 12. Other mirror shapes allow for a focusing of the light toward individual detectors 13, either in the plane of a constant azimuth angle using a mirror profile that is concave in this plane and/or in the plane orthogonal to the optical axis, using individual mirror segments focusing respectively onto one detector.

As shown in FIG. 16, the radiation 10 at a typical polar angle range of 10°+/−ca. 1° can be imaged on one, or, preferably, several, detectors 13 using a simple conical mirror 12. The individual photo detectors 13 are preferably distributed evenly on the circumference, as shown in the right part of FIG. 16. A reasonable circumferential or azimuthal resolution is possible, e.g., using eight sensors 13, as derived further above. In order to image a larger polar angle range onto the detectors 13, additional mirror surfaces 12a can, as shown by way of example in FIG. 17, be mounted in the region of the nozzle 2 and/or above the sensors, but still below the focusing optics, which additional mirror surfaces reflect the radiation either onto the same deflector 13 or onto several detectors 13 or lines of sensors 13b arranged at height or in the beam axis direction 14. Here, several—preferably, eight, or even more—line sensors 13b, or vertical arrangements of individual sensors 13, are arranged, distributed over the circumference, at the same distance to the nozzle opening. In addition to several mirror elements 12b above the machining nozzle, small mirror surfaces 12a can also be accommodated in the machining nozzle 2. With the arrangement of several detectors 13 on the circumference and in the beam axis direction, or of several line sensors 13b on the circumference, a detector array is produced. With this detector array, an azimuthally and radially spatially-resolved image of the process zone can be detected. It is furthermore conceivable that the radiation is deflected consecutively by two or more mirrors 12a, 12b, before it impinges on a sensor 13, 13b.

The detector arrangement can have various intermediate optical elements in the observation beam path, such as conical mirrors, segmented mirrors, or apertures. Instead of traditional sensors, the radiation can also be coupled into optical waveguides and guided onto photo detectors at another location. In a preferred embodiment, the fiber ends are arranged in a line and lead to a line sensor, or are arranged as a rectangular block and lead to an area sensor, whereby a high resolution can be achieved.

The opening of the nozzle 2 is so far the only aperture that acts as an entrance pupil. The resolution thus achievable is, in particular, limited orthogonally to the beam axis or in the azimuthal direction. In order to achieve a higher azimuthal or circumferential resolution, apertures must be mounted in front of the deflection mirrors. This is preferably achieved by means of slit apertures according to FIG. 18. Here, a detector structure with a circular conical mirror 12 and a ring 15 inserted before it, with slit apertures 16 distributed over the circumference of the ring 15, is shown. Radiation 8 entering through the machining nozzle 2 arrives through the slit apertures 16 at the conical mirror 12 and is reflected by the latter onto one of the sensors 13 on, for example, a sensor ring 17.

It goes without saying that the detectors 13 with different sensitivity ranges with respect to the radiation wavelength can be used. For example, silicon detectors for the visible wavelength range, and indium gallium arsenide detectors (InGaAs) for the near infrared range. Additionally, sensors for ultraviolet radiation and pyro-detectors for far-infrared radiation, as well as prefilters for smaller wavelength ranges, can also be used. Preferably, the wavelength ranges between 0.7 and 1 µm and/or between 1.45 and 1.8 µm are provided. In the first case, there is no daylight sensitivity in comparison to the unfiltered variant, and the respective wavelength range is very good pyrometrically; silicon detectors can, moreover, be used here. The second range of somewhat larger wavelength—measurable using InGaAs photo detectors—allows for an improved ability to distinguish slag from liquid metal, as a result of the different emissivity in this wavelength range.

Another embodiment of the invention, fundamentally different from the discrete detector devices above, is shown in FIG. 19. A traditional detector arrangement, with a camera 19 in coaxial arrangement and behind the focusing optics 18, is used in order to image the process zone up to the nozzle edge as usual. The coaxially invisible part of the machining zone is now imaged via a suitably curved, mirroring, free-form surface 12a onto the free camera detector surface, in addition to the coaxial image of the process zone. As a result of the imaging properties, it is necessary to position the mirror surface 12a near the process. This increases the risk of contamination. A particularly advantageous embodiment of the invention is therefore to integrate the mirror surface 12a into the machining nozzle 2, which is replaced routinely.

Another, similar embodiment is shown in FIG. 20. As detector arrangement in addition to the embodiments explained above, with observation directions at a polar angle of equal to or greater than 5° in relation to the optical axis 14 of the working laser beam 3, a camera 19 with a direct view towards the process zone 7 is, for example, used. This camera is, however, not arranged coaxially to the optical axis 14 of the working laser beam in the traditional manner, but has, as shown in FIG. 20, an offset r between the optical axis 14 of the working laser beam 3 and the optical axis of the camera or its observation direction. The camera 19 is in this case located in the propagation direction of the working laser beam 3 in front of the focusing element, such as a lens, 18. By using a suitable optical filter, the lower end of the cutting front can thereby be detected directly from camera images, in real time, by means of digital image processing, as a transition between the bright cutting front 7 and the, for example, dark cutting gap 6. In this case, the observation direction of the camera 19 extends, at least after the focusing element 18, obliquely to the optical axis of the working laser beam 3 toward the machining zone. To this end, the optical axis of the detector, such as the camera 19 itself, can also extend obliquely to the optical axis 14 of the working laser beam 3.

Another embodiment, which allows a very slender constructive design of the laser machining head, comprises a camera 19, the optical axis of which extends in the propagation direction of the working laser beam 3 in front of the focusing element 18 substantially in parallel to the optical axis 14 of the working laser beam. After the focusing element 18, however, the observation direction extends obliquely toward the machining zone. In this case, the deflection of the obliquely entering detected radiation onto the camera 19 is also brought about by the focusing element 18.

As listed above regarding the physical aspects of laser-flame cutting, the cutting front overrun $\Delta n$ correlates with the slag residue 5a. This means that, if the cutting front overrun exceeds a certain threshold value, the risk of slag residue is increased. It is particularly advantageous to regulate the cutting front overrun, which is detected in real time from the camera images, to a certain target value.

The camera arrangement 19 is preferably arranged such that its observation direction is oriented in the direction opposite the movement direction of the nozzle 2. In order to take into consideration any, even alternating, movement or feed directions of the nozzle 2, it is particularly preferably possible to also turn the camera arrangement 19 according to the cutting direction, e.g., using a step motor, so that the observation direction 8 is always oriented in the direction opposite the cutting direction, backwards into the cutting gap. Depending upon the size of the cutting front overrun typical of the material to be machined, the offset r can be set differently, so that the polar angle φ between the optical axis of the working laser beam 14 and the optical axis of the camera 19 can also take different values. The maximum polar angle φ is limited by the apertures of the interjacent optics of the working laser beam path. Moreover, for the purposes of correcting imaging errors, the camera axis can be tilted slightly.

A particularly advantageous embodiment of the invention is to adapt the offset r in real time to the detected cutting front overrun, up to a defined upper limit, by means of an adjusting unit, such as a step motor. This ensures that the end to be detected of the cutting front does not move outside the image region of the camera. If the cutting front end nonetheless moves outside the image region, either in the case of an unregulated observation of the cutting front overrun or in the case of active regulation as a result of a suddenly-occurring cutting process disruption, the detector device according to the invention with the polar angle range of 5° or more can detect the occurring quality defect.

LIST OF REFERENCE SYMBOLS

1 Workpiece, plate
2 Cutting nozzle
3 Working laser beam
4 Cut surface
5 Molten mass, slag (5a slag residue)
6 Cutting kerf
7 Cutting front, machining zone, or process zone
8 General observation direction or radiation beam of a detector
9 Laser cutting head
10 Radiation beam of a 10° detector (10a radiation beam of a 5° detector)
11 Fields of vision of the detectors
12 Intermediate optical element, specifically conical mirror (12a, 12b mirror elements)
13 Photodiode (13a cylinder sensor, 13b sensor line)
14 Optical axis for working laser beam
15 Aperture ring
16 Slit apertures
17 Sensor ring
18 Lens
19 Camera
P Process control
$\Delta n$ Cutting front overrun or overrun of a laser cutting process ($\Delta n_0$ normal development; $\Delta n_1$ too large a development)
$\beta$ Azimuth angle between the observation direction of a detector and the cutting direction or movement direction of the cutting nozzle

The invention claimed is:

1. A laser-machining device comprising:
an arrangement for producing and guiding a working laser beam, including a nozzle having an opening for emission of the working laser beam to a machining zone, wherein an optical axis is defined in the arrangement, and the arrangement includes at least one focusing element, which focuses the working laser beam, near the opening of the nozzle; and
an arrangement for monitoring a machining process performed by the laser-machining device, the arrangement for monitoring the machining process comprising:
at least one group of detector arrangements, which are sensitive to a radiation characteristic of the machining process, wherein the at least one group of detector arrangements are associated with at least one evaluating unit, wherein the detector arrangements of each at least one group are arranged in a ring shape about the optical axis and an observation direction of the detector arrangements is oriented, at least in a sub-region between the at least one focusing element closest to the machining zone and the machining zone in a sub-region at a distance from the focusing element toward the machining zone greater than a lower edge region of the nozzle, at a polar angle ($\varphi_1$) larger than 5° in relation to the optical axis of the working laser beam.

2. The laser-machining device according to claim 1, wherein at least one intermediate optical element for at least one of the detector arrangements is arranged between the focusing element closest to the machining zone and the machining zone and comprises at least one reflector region.

3. The laser-machining device according to claim 1, wherein the observation direction of at least one of the detector arrangements is directed in a range of the azimuth angle ($\beta$) of at most 45° in relation to a movement direction of the nozzle and opposite the movement direction toward the machining zone.

4. The laser-machining device according to claim 1, wherein each group of detector arrangements arranged about the optical axis comprises at least five detector arrangements or at least eight detector arrangements.

5. The laser-machining device according to claim 1, wherein at least one of the detector arrangements has a detector and at least one of the detector arrangements includes an intermediate optical element that includes a deflection arrangement, wherein the deflector has a fan-shaped observation radiation beam with respect to the polar angle ($\varphi$), and the arrangement of the intermediate optical element deflects segments, which differ with respect to the polar angle ($\varphi$), of a certain fan-shaped observation radiation beam, each toward the same region of the machining zone.

6. The laser-machining device according to claim 1, wherein several detectors or intermediate elements are provided at substantially the same azimuth angle $\beta$ about the optical axis, the observation directions of which are directed toward the machining zone at different polar angles, or wherein one detector or one deflection arrangement oscillates at substantially the same azimuth angle $\beta$ about the optical axis between different polar angles, and the observation direction is respectively oriented at different polar angles toward the machining zone.

7. The laser-machining device according to claim 1, wherein several deflection arrangements are arranged and evenly distributed about the optical axis at different azimuth angles $\beta$.

8. The laser-machining device according to claim 1, wherein at least one of the detector arrangements comprises a detector and at least one intermediate optical element that includes a reflector arrangement, wherein the reflector arrangement deflects the entirety of the radiation emitted by the machining zone at a certain polar angle towards the detector.

9. The laser-machining device according to claim 1, wherein the detector arrangements comprise coupling points, arranged in a ring shape about the optical axis and arranged along at least one circle coaxial and substantially orthogonal to the optical axis, for radiation in radiation guiding arrangements or other deflection arrangements, wherein detectors are positioned at a distance from the coupling points or the other deflection arrangements.

10. The laser-machining device according to claim 1, wherein the detector arrangements include photo detectors, wherein the photodetectors comprises photodiodes, thermopiles, or line sensors.

11. The laser-machining device according to claim 1, wherein the detector arrangements are sensitive to at least two different wavelength ranges, wherein the wavelength ranges are between 0.7 and 1 µm or between 1.45 and 1.8 µm.

12. The laser-machining device according to claim 1, wherein aperture arrangements are arranged in front of the detectors or in front of intermediate elements, wherein the aperture arrangements comprise slit apertures.

13. The laser-machining device according to claim 1, wherein at least some detectors are inserted into the nozzle or formed therein, wherein the arrangement for producing and guiding a working laser beam and the nozzle are separably connected to each other.

14. The laser-machining device according to claim 1, wherein a detector with the observation direction parallel to the optical axis is positioned on a side of the focusing element facing away from the machining zone, and an intermediate optical element is positioned between the focusing element and the machining zone, wherein the intermediate element deflects the observation direction of the detector for at least one azimuth angle β to the polar angle larger than 5° in relation to the optical axis of the working laser beam in the direction toward the machining zone.

15. The laser-machining device according to claim 14, wherein the polar angle is greater than or equal to 7°.

16. The laser-machining device according to claim 14, wherein the polar angle is approximately 10°.

17. The laser-machining device according to claim 14, wherein intermediate elements that include reflector arrangements are inserted into the nozzle or are formed therein.

18. The laser-machining device according to claim 14, wherein the intermediate element deflects the observation direction of the detector in a range of the azimuth angle β of at most 45° in relation to the movement direction of the nozzle and opposite a movement direction toward the machining zone, wherein the intermediate element deflects the radiation from the machining zone at least at different polar angles and at different azimuth angles β toward the detector oriented in parallel to the optical axis.

19. The laser-machining device according to claim 1, wherein the detector arrangement comprises an additional detector, which is arranged next to the working laser beam and in front of the focusing element with respect to a propagation direction of said working laser beam, and the observation direction of which extends, at least after the focusing element, obliquely to the optical axis of the working laser beam toward the machining zone, wherein an optical axis of the detector extends obliquely to the optical axis of the working laser beam.

20. The laser-machining device according to claim 19, wherein the optical axis of the detector extends in the propagation direction of the working laser beam substantially in parallel to the optical axis of the working laser beam in front of the focusing element and obliquely toward the machining zone after the focusing element, after deflection by the focusing element.

21. The laser-machining device according to claim 19, wherein the observation direction of the detector arrangement is oriented in a direction opposite the movement direction of the nozzle, wherein at least one of the detector arrangement can be moved in a circumferential direction about the working laser beam and the observation direction can take different polar angles ($_\phi$).

22. The laser-machining device according to claim 19, wherein the observation direction of the additional detector extends at a polar angle ($_\phi$) of greater than or equal to 2° in relation to the optical axis of the working laser beam or at a polar angle ($_\phi$) between 2° and 4°, at least after the focusing element.

23. The laser-machining device according to claim 1, wherein the polar angle is greater than or equal to 7°.

24. The laser-machining device according to claim 1, wherein the element that focuses the working laser beam comprises a cutting lens.

25. The laser-machining device according to claim 1, wherein the detector arrangements of each at least one group are arranged along at least one circle coaxial and substantially orthogonal to the optical axis.

26. The laser-machining device according to claim 1, wherein the polar angle is approximately 10°.

27. A laser-machining device comprising:
an arrangement for producing and guiding a working laser beam, including a nozzle having an opening for emission of the working laser beam to a machining zone, wherein an optical axis is defined in the arrangement, and the arrangement includes at least one focusing element, which focuses the working laser beam, near the opening of the nozzle; and
an arrangement for monitoring a machining process performed by the laser-machining device, the arrangement for monitoring the machining process comprising:
at least one group of detector arrangements, which are sensitive to a radiation characteristic of the machining process, wherein the at least one group of detector arrangements are associated with at least one evaluating unit, wherein the detector arrangements of each at least one group are arranged in a ring shape about the optical axis and an observation direction of the detector arrangements is oriented, at least in a sub-region between the at least one focusing element closest to the machining zone and the machining zone in a sub-region at a distance from the focusing element toward the machining zone greater than a lower edge region of the nozzle, at a polar angle ($_{\phi 1}$) larger than 5° in relation to the optical axis of the working laser beam,
at least one of the detector arrangements comprises intermediate elements that include reflector arrangements inserted into the nozzle or are formed therein.

* * * * *